(12) United States Patent
Hayashi

(10) Patent No.: US 9,692,965 B2
(45) Date of Patent: Jun. 27, 2017

(54) OMNIDIRECTIONAL IMAGE EDITING PROGRAM AND OMNIDIRECTIONAL IMAGE EDITING APPARATUS

(76) Inventor: Mitsuo Hayashi, Tokyo (JP)

( * ) Notice: Subject to any disclaimer, the term of this patent is extended or adjusted under 35 U.S.C. 154(b) by 521 days.

(21) Appl. No.: 14/113,330

(22) PCT Filed: Apr. 17, 2012

(86) PCT No.: PCT/JP2012/002636
§ 371 (c)(1),
(2), (4) Date: Nov. 20, 2013

(87) PCT Pub. No.: WO2012/147303
PCT Pub. Date: Nov. 1, 2012

(65) Prior Publication Data
US 2014/0085412 A1 Mar. 27, 2014

(30) Foreign Application Priority Data
Apr. 25, 2011 (JP) .................... 2011-096940

(51) Int. Cl.
H04N 5/232 (2006.01)
G06T 11/60 (2006.01)
G06T 3/00 (2006.01)

(52) U.S. Cl.
CPC ....... *H04N 5/23238* (2013.01); *G06T 3/0062* (2013.01); *G06T 11/60* (2013.01)

(58) Field of Classification Search
CPC ........ G09G 5/00; G06T 19/003; G06T 3/0018
See application file for complete search history.

(56) References Cited

U.S. PATENT DOCUMENTS 5,446,833 A * 8/1995 Miller .................... G06T 15/04
 345/585
6,005,584 A * 12/1999 Kitamura .............. G06T 11/001
 345/582

(Continued)

FOREIGN PATENT DOCUMENTS

| JP | 2002-024860 A | 1/2002 |
| JP | 2004-038926 A | 2/2004 |
| JP | 2009-210963 A | 9/2009 |

OTHER PUBLICATIONS

Texture Mapping, Pearson, 2003, accessible at http://www.pearsonhighered.com/samplechapter/0321173481.pdf.*

(Continued)

*Primary Examiner* — Jacinta M Crawford
*Assistant Examiner* — Phong Nguyen
(74) *Attorney, Agent, or Firm* — Rabin & Berdo, P.C.

(57) ABSTRACT

This invention has an object to provide an image editing program and apparatus allowing users to intuitively produce images covering the omnidirection. In a virtual space, an omnidirectional image is projected according to a coordinate conversion and displayed at a display device 20. For omnidirectional image edition, a view direction and a view angle are changed in the virtual space with a pointing device 30, and under control of a central control unit 11, display of the omnidirectional image in a screen image is renewed to perform two-dimensional drawing to an image for drawing having the same coordinate system as that of the screen image with the pointing device 30 using the screen image as a clue. After the end of drawing, the coordinate conversion is made to the drawing image to project the image at a proper position of the omnidirectional image. The omnidirectional image is thus completed by repeating the steps of view direction changes and drawing.

24 Claims, 19 Drawing Sheets

(56) References Cited

U.S. PATENT DOCUMENTS

| | | | |
|---|---|---|---|
| 6,141,034 A * | 10/2000 | McCutchen | G02B 27/22 348/36 |
| 6,268,865 B1 * | 7/2001 | Daniels | G06T 11/001 345/582 |
| 6,522,329 B1 * | 2/2003 | Ihara | G06T 11/20 345/441 |
| 6,671,400 B1 * | 12/2003 | Ekpar | H04N 5/23238 382/157 |
| 6,771,276 B1 * | 8/2004 | Highsmith | G06T 15/20 345/419 |
| 2002/0018065 A1 * | 2/2002 | Tobita | G06T 15/20 345/427 |
| 2003/0160785 A1 | 8/2003 | Baumberg | |
| 2004/0095357 A1 * | 5/2004 | Oh | G06T 15/205 345/589 |
| 2004/0247173 A1 * | 12/2004 | Nielsen | G06T 3/0062 382/154 |
| 2007/0122058 A1 * | 5/2007 | Kitaura | G06T 7/0071 382/284 |
| 2008/0291217 A1 * | 11/2008 | Vincent | G06T 17/05 345/629 |
| 2009/0002363 A1 * | 1/2009 | Wu | G06T 17/10 345/419 |
| 2009/0153549 A1 * | 6/2009 | Lynch | G06T 15/205 345/419 |
| 2009/0244062 A1 * | 10/2009 | Steedly | G06T 15/205 345/420 |
| 2010/0123737 A1 | 5/2010 | Williamson et al. | |
| 2010/0201682 A1 * | 8/2010 | Quan | G06K 9/00704 345/419 |
| 2010/0226577 A1 * | 9/2010 | Saito | G06T 11/001 382/195 |
| 2011/0273528 A1 * | 11/2011 | Sazawa | G06T 15/20 348/36 |
| 2012/0038739 A1 * | 2/2012 | Welch | H04N 13/0488 348/14.01 |
| 2012/0206471 A1 * | 8/2012 | Sarnoff | G06T 11/60 345/581 |
| 2013/0127847 A1 * | 5/2013 | Jin | G06T 17/20 345/420 |

OTHER PUBLICATIONS

Li Su, "Self-calibration and browse algorithm of cubic panorama", Article 1, pp. 33-40, Jan. 2011, English abstract on pp. 8-9.

\* cited by examiner

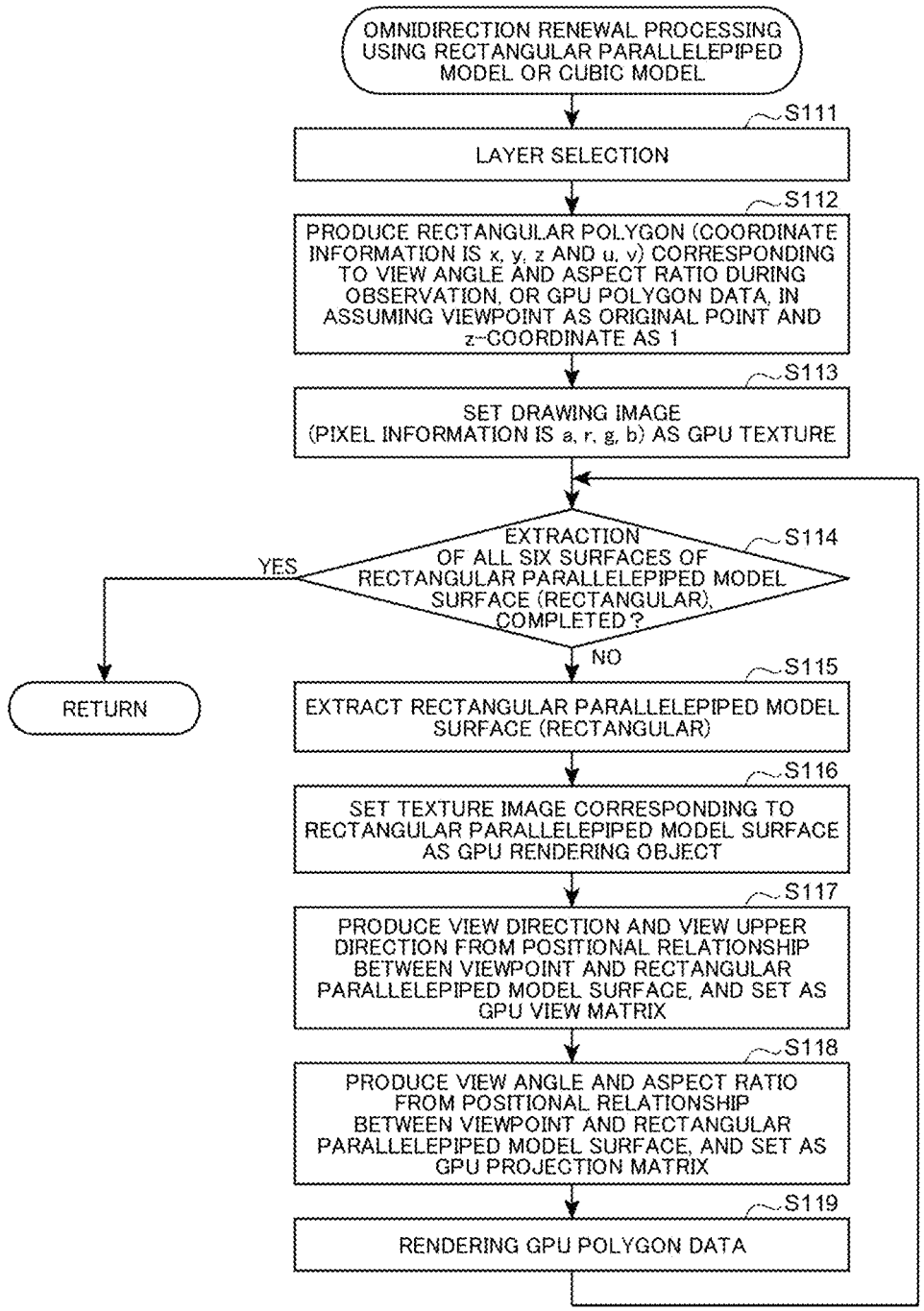

US 9,692,965 B2

OMNIDIRECTIONAL IMAGE EDITING PROGRAM AND OMNIDIRECTIONAL IMAGE EDITING APPARATUS

FIELD OF THE INVENTION

This invention relates to an omnidirectional image editing program and an omnidirectional image editing apparatus for editing an image regarded as a background covering the omnidirection of an operator or a viewer (hereinafter, referred to as "omnidirectional image").

DESCRIPTION OF RELATED ART

In the field of the omnidirectional image, production methods by live action images such as, e.g., omnidirectional camera or swing panorama, and production methods by computer graphics such as, e.g., sphere map and skybox, have been established these days. The omnidirectional camera is a camera capable of observing a wide range of 360 degrees with a single device, whereas the swing panorama is a function to automatically synthesize panorama pictures. The sphere map is a special texture expressing a space around the object or a lighting effect and shows the entire surrounding with a single sheet two-dimensional image. The skybox is also a special texture with substantially the same object as that of the sphere map and shows the entire surrounding with six sheets of square shape images.

Patent Document #1 discloses a method for editing textures for three-dimensional computer models. That is, with the above method, an image indicating the three-dimensional computer model and the texture data applied to the model is produced from an observation direction selected by a user, and is displayed to the user. The image data are modified according to user's instruction, thereby modifying the texture data correspondingly. In addition, a processing for specifying respective polygons located in the three-dimensional computer model with oblique angles with respect to the observation direction of the image presented to the user, is executed. The specified polygons are exempted from subsequent processings so as not to change the texture data of these polygons.

Patent Document #1 is: Japanese Patent Application Publication No.

SUMMARY OF THE INVENTION

Problems to be Solved by the Invention

With the art in Patent Document #1, however, general mesh is on target, and this prior art does not limits move of a viewpoint, although using the polygons and editing texture images using a conversion from a screen coordinate system to a texture coordinate system. The prior art does not use semi-transparent or alpha blend, and the image data for display produced according to the user's observation direction, by themselves, are edited with some external program and are subject to feedback. Limiting changes of the texture data with respect to the obliquely angled polygons prevents edition for omnidirectional image from drawing with a largely wider view angle.

Thus, the prior art omnidirectional image producing method with pictures is not established adequately, and requires excessive times for production.

In consideration of the above technical problems, it is an object of the invention to provide an omnidirectional image editing program and an omnidirectional image editing apparatus allowing users to intuitively edit omnidirectional images. It is another object of the invention to provide an omnidirectional image editing program and an omnidirectional image editing apparatus capable of producing panorama images as a work and movies subject to reviewing, and also capable of producing a making movie by reproducing working steps.

Means for Solving Problems

To solve the above technical problems, an omnidirectional image editing apparatus according to a first aspect of the invention includes: a manipulation input unit for receiving an input for a manipulation; a displaying unit for displaying a variety of images; and a central control unit for making a control in accordance to an omnidirectional image editing program, wherein the central control unit receives at least information of a coordinate and a button input from the manipulation input unit, wherein the central control unit, in a case of a view direction change mode, performs renewing a view direction angle and a view angle based on the input information, doing a screen renewal processing, and outputting an image to the displaying unit, in a case of a drawing mode, selects at least a drawing parameter and makes drawing on an image for drawing based on the drawing parameter, and, in a case of a completion of drawing, performs executing an omnidirectional image renewal processing, deleting the image for drawing, doing a screen renewal processing, and outputting an image to the displaying unit, and wherein a view point does not move in any cases.

An omnidirectional image editing program according to a second aspect of the invention, in which a computer functions as a central control unit in performing the steps of: receiving input information of at least information of a coordinate and a button from a manipulation input unit; in a case of a view direction change mode, renewing a view direction angle and a view angle based on the input information, doing a screen renewal processing, and outputting an image to the displaying unit; in a case of a drawing mode, selecting at least a drawing parameter and making drawing on an image for drawing based on the drawing parameter; and in a case of a completion of drawing, executing an omnidirectional image renewal processing, deleting the image for drawing, doing the screen renewal processing, and outputting an image to the displaying unit, wherein a view point does not move in any cases.

Advantages of the Invention

According to the omnidirectional image editing program and apparatus, the omnidirectional image can be edited intuitively.

BRIEF DESCRIPTION OF THE DRAWINGS

FIG. 24 is a flowchart showing a flow of the omnidirectional image renewal processing using the rectangular parallelepiped model or the cubic model.

EMBODIMENTS FOR EMPLOYING THE INVENTION

Figure 1:
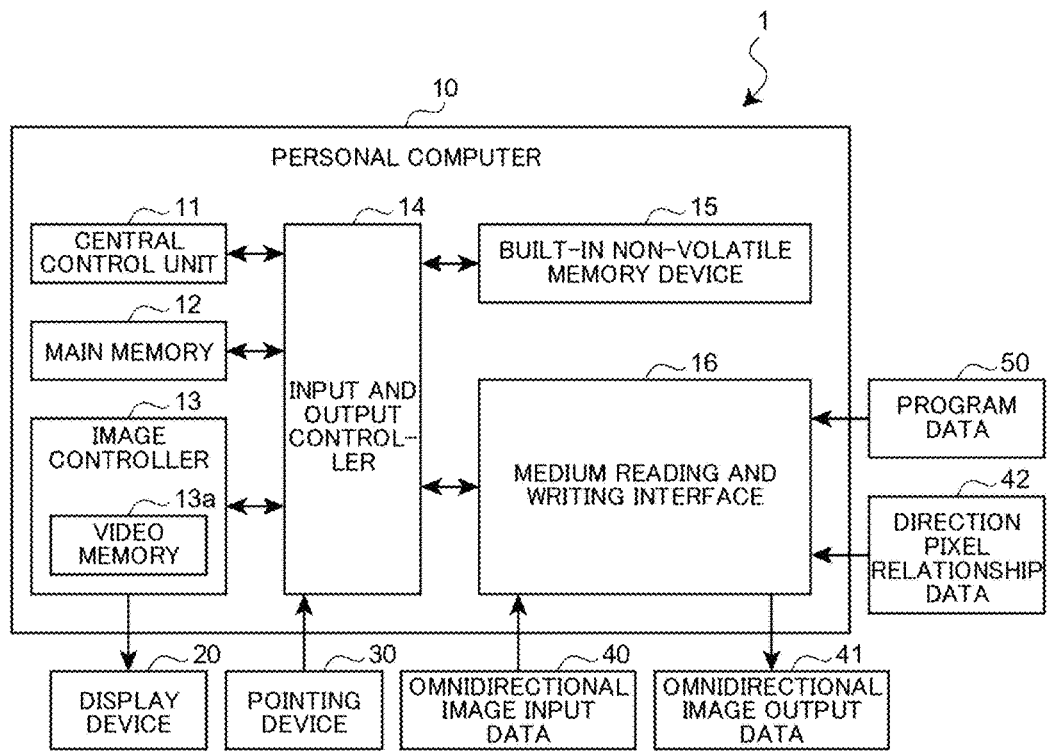
FIG. 1 is a structural diagram showing an omnidirectional image editing apparatus according to a first embodiment of the invention.

Hereinafter, referring to the drawings, a preferred embodiment of the omnidirectional image editing program and the omnidirectional image editing apparatus according to the invention is described. The omnidirectional image editing program and the omnidirectional image editing apparatus according to the invention are not limited to those described below but are modifiable properly as far as not deviated from the essential concept of the invention.

With the omnidirectional image editing program and apparatus according to the invention, an omnidirectional image as an image regarded as a background covering the omnidirection of the operator is displayed on a display device upon projecting in a virtual space onto a two-dimensional screen image through a coordinate conversion. The operator aiming at editing an omnidirectional image first renews display of the omnidirectional image in the screen image by modifying the view direction and view angle in the virtual space with a pointing device, and two-dimensionally makes drawing with the pointing device to a drawing image having the same coordinate as the screen image upon using the screen image as a clue. After completion of drawing, the operator performs the coordinate conversion to the drawing image and projects the converted data to a proper position on the omnidirectional image. The operator thus repeats such steps of view direction change and drawing, thereby completes making of the omnidirectional image. Details are as follows.

FIG. 1 shows and describes a structure of the omnidirectional image editing apparatus according to an embodiment of the invention.

As shown in FIG. 1, the omnidirectional image editing apparatus 1 is structured of, e.g., a personal computer 10, a display device 20, and a pointing device 30.

The personal computer 10 includes a central control unit 11 made of, e.g., a processor for multitasking, a main memory 12 made of, e.g., RAMs serving as a temporarily memorizing device, an image controller 13 made of, e.g., a video card, an input and output controller 14, a built-in non-volatile memory device 15, and a medium reading and writing interface 16.

The image controller 13 has a video memory 13a. The video memory 13a means a location temporarily saving data in the same way as the main memory 12 in the body of the personal computer 10, and the memory belonging to a graphic card may be called as VRAM. In a case where a three-dimensional graphic image is displayed on a screen, the data amount required at that time becomes larger. The data completed processing at the image controller 13 are saved at the video memory 13a and used at appropriate times. The image controller 13 can more smoothly display even fine three-dimensional graphic image without any failure as the size of the video memory 13a is larger.

The display device 20 is a device capable of displaying images as represented by LCD (Liquid Crystal Display) or the like. The pointing device 30 is a device capable of coordinate inputting and/or button inputting, as represented by a mouse, a touch panel, and a pen tablet.

Program data 50, direction pixel relationship data 42, and omnidirectional image input data 40 are entered with the medium reading and writing interface 16, and omnidirectional image output data 41 are outputted through the medium reading and writing interface 16.

The program data 50 are software in which this invention is operable. These are corresponding to data or the like of the omnidirectional image editing program described below.

The direction pixel relationship data 42 are tables or functions providing relationship mutually between the direction and the position of the pixel. When a polygon model is used, polygon model data are corresponding to those and become three-dimensional shape object or objects. The direction pixel relationship data 42 may belong to the program data, and also can be made by reading data defined externally.

The omnidirectional image input data 40 and the omnidirectional image output data 41 are image groups handled by software. For example, if a polygon model is used, a texture image group corresponds to this. The inputted texture image groups and the like are stored temporally in the main memory 12.

The omnidirectional image input data 40 and the program data 50 may be read out of an external memory device, not shown, or can be transmitted from an external computer to be stored in the built-in non-volatile memory device 15. The output data can be written in an external memory device, not shown, or can be transmitted to an external computer via a communication network.

Figure 2:
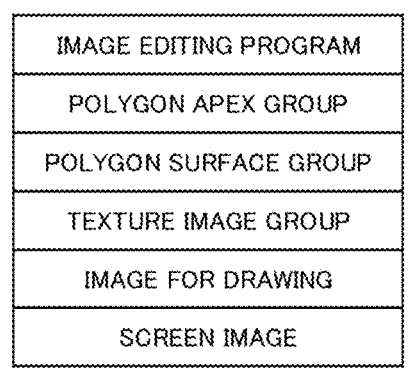
FIG. 2 is a diagram showing an example of a memory map of a main memory 12 used in a case of editing omnidirectional images utilizing a polygon model.

In FIG. 2, an example of a memory map in the main memory 12 used in a case where an omnidirectional image is edited in use of a polygon model, is shown and described herein.

Each image has color information with opacity (a: alpha, r: red, g: green, b:blue) as a two-dimensional array. The term "alpha" indicates opacity information. In personal computers, color information of one pixel is recorded by a unit of 24 bits (one color uses 8 bits, three colors: red, green, blue, 8×3=24 bits). With 8 bits, 256 grayscale recording is possible. PNG with alpha (32 bit PNG) allows recording of opacity of each pixel with 8 bits, 256 grayscale in addition to the color information. If the alpha value is zero, it means perfectly transparent, and if it is 255, it means perfectly opaque.

A polygon apex (vertex) has a three-dimensional space coordinate (x: horizontal, y: vertical, z: depth) and a two-dimensional texture coordinate (u: horizontal, v: vertical). The information of the polygon surface group includes three references to the polygon apex and references to the texture image only for several layers since the polygon surface represents a triangle. The polygon model, because of representing a three-dimensional shape, includes the polygon apexes and the polygon surfaces respectively as arrays. In a case that the structure of the texture group owned by one layer is the same to that of any other layer, the reference to the texture image can be a correlative reference within the layer.

The screen image means an image presented to the operator by the display device 20 upon projecting the omnidirectional image to the two-dimensional coordinate plane through the coordinate conversion.

Drawing means a work for drawing such as, e.g., shapes and lines to images on a two-dimensional coordinate (plane) mainly using a pointing device. The image for drawing (or namely "drawing image") means an image on a two-dimensional coordinate (plane) that is subject to drawing made by the operator in fact. The image for drawing is located in a recording region other than that of the screen image, has the same coordinate system as that of the screen image, and is in a state of perfect transparency before start of drawing. The opacity information and color information is renewed at location subject to drawing. That is, this is equal to a situation that the operator does drawing at a transparent layer overlapping the screen image. A drawing parameter means a parameter deciding the drawing method and attribute. Exemplified as a method are such as, e.g., freehand, straight line, rectangular, circle, and image pasting. What can be thought as the attribute is such as, e.g., width and color in a case of line, and filling pattern in a case of shape. The expressing method becomes more diversified as the types of the parameter increase. In this specification, the term "drawing" includes a concept of "painting" as a general sense.

Use of the polygon model is merely an example, and this is not technically limiting any means for displaying and editing the omnidirectional image. It is not necessary to use concept of polygon model and texture as far as pixels are made in relation with the omnidirection. For example, with this program, an omnidirectional image obtained from such as, e.g., an omnidirectional camera using a sphere mirror can be edited.

Figure 3:
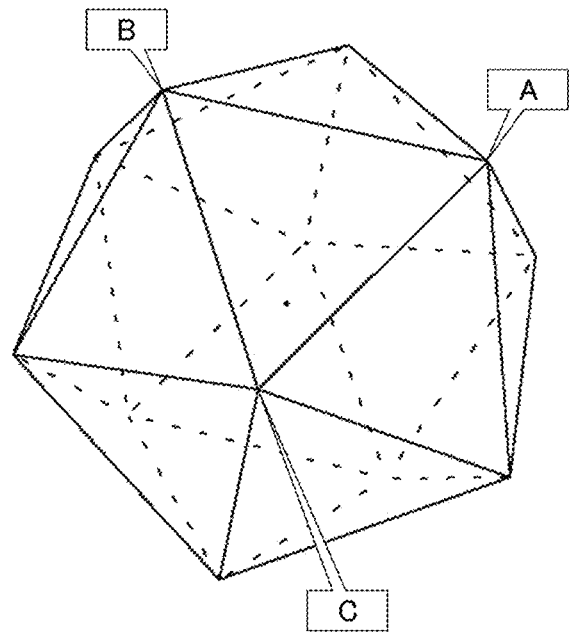
FIG. 3 is a diagram showing an example of a regular icosahedron polygon model.

Now, as a example of a background covering the omnidirection, upon preparing a polygon model of a regular icosahedron as shown in FIG. 3, a situation that a center thereof is set as a viewpoint is thought. It is presumed that the viewpoint does not move.

The polygon model is provided with two texture images, and is treated as layers of an upper layer (near side when viewed from the operator) and a lower layer (far side when viewed from the operator). In this embodiment, a view direction angle common in the whole layers can be used as a view direction angle used for drawing and indicating of respective layers. With this usage, use in which coincidence of the view direction angels of the respective layers is important (e.g., use for a layer aiming at "line" and a layer aiming at "filling") becomes possible.

It is to be noted that treating the regular icosahedron polygon model is no more than an example. If a texture image corresponding to the respective polygon surfaces is set, any polygon model can be used. For example, a cube or the like can be used in lieu of the regular icosahedron.

Figure 4:
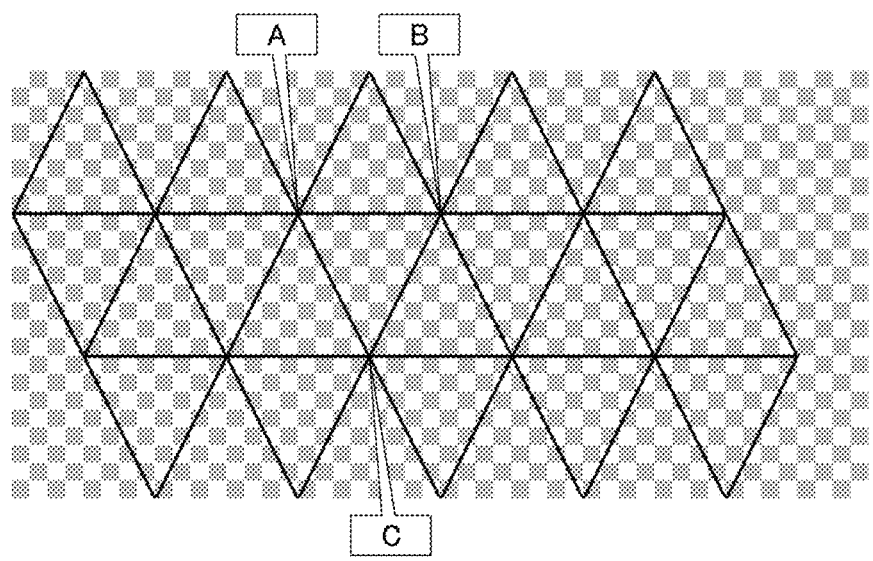
FIG. 4 is a diagram showing an upper layer texture given at the polygon model.

FIG. 4 shows and describes an example of an upper layer texture corresponding to the whole polygon surfaces of the regular icosahedron polygon model. The texture coordinate of the respective polygon apexes are set in regarded as apexes of a shape similar to a net of the regular icosahedron. The solid lines in FIG. 4 merely indicate positional relationships of the texture coordinate of the respective apexes on a basis of polygon surface, and such solid lines are not required for actual textures. Because the upper layer texture is displayed as overlapped to the lower layer texture, the upper layer texture can be synthesized with the lower layer texture using opacity. It is desirable for upper layer texture images to be perfectly transparent before starting processing. A checkered pattern in FIG. 4 shows transparency, and actual textures do not require to include such patterns.

Figure 5:
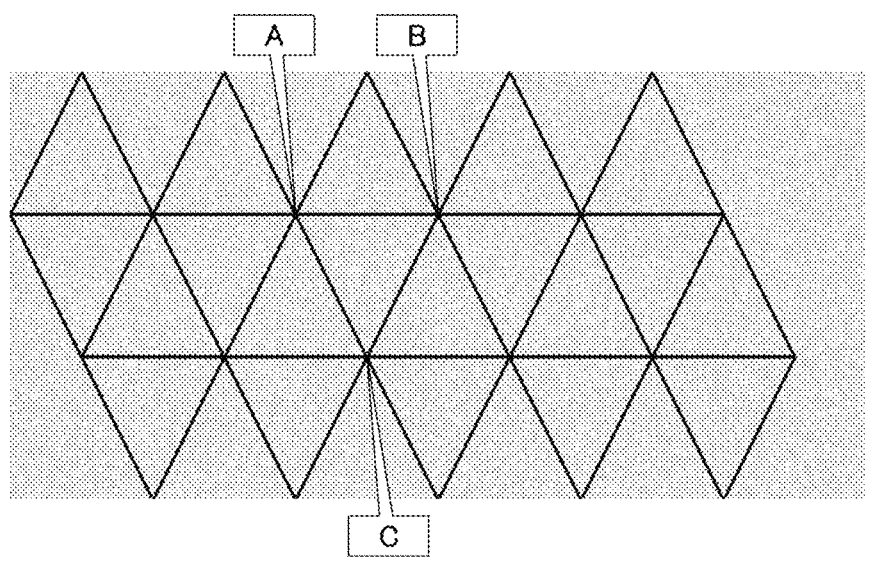
FIG. 5 is a diagram showing a lower layer texture given at the polygon model.

FIG. 5 shows and describes an example of a lower layer texture corresponding to the whole polygon surfaces of the regular icosahedron polygon model. In the lower layer texture, the texture coordinate of the respective polygon apexes is set in substantially the same way as the upper layer texture. As an example of a means for making the operator understand easily the view direction angle, an untransparent random noise pattern is applied over the entire texture. It is desirable that the texture of the lowermost layer is perfectly opaque. This is to prevent finished works from being with any remaining transparent or semi-transparent pixel. This, however, is not applicable in a case that overlapped upper layer textures bring non-transparency or that it is presumed that a finished work is to be overlapped to another motion picture.

Figure 6:
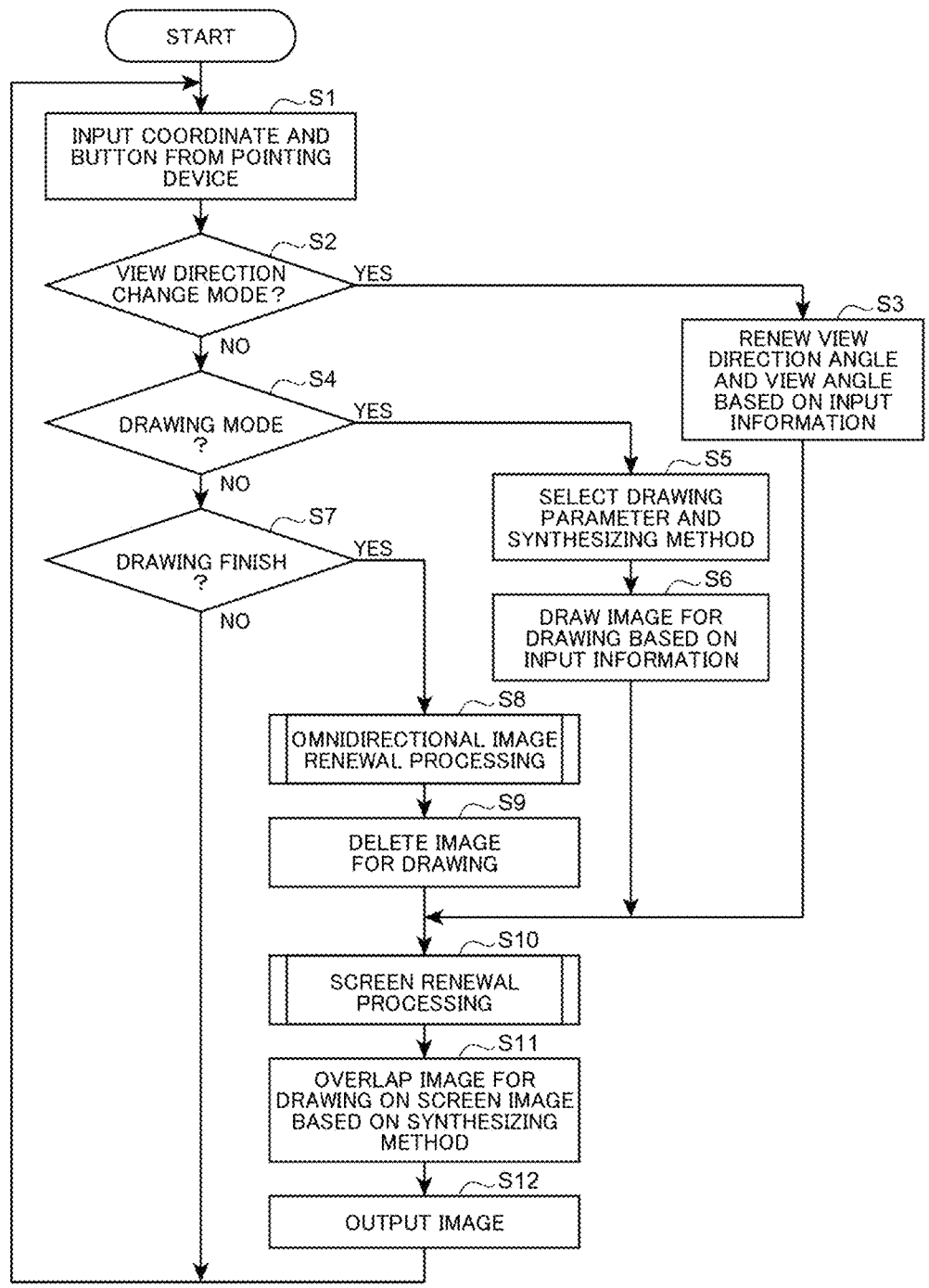
FIG. 6 is a flowchart for describing a flow of proces sings executed according to the omnidirectional image editing program by means of the omnidirectional image editing apparatus according to an embodiment of the invention.

Referring to the flowchart in FIG. 6, a processing flow executed with the omnidirectional image editing apparatus 1 of this embodiment in accordance with the omnidirectional image editing program, is described. It is assumed that the pointing device 30 is a two-button mouse, and in exemplifying one operation of the omnidirectional image editing program, any description not directly relating to this invention is omitted. This processing is executed at the central control unit 11 according to the omnidirectional image editing program.

After starting this processing, the coordinate and buttons are entered from the pointing device 30 (step S1). Subsequently, a judgment is made as to whether it is in a view direction change mode (step S2). If it is in the view direction change mode (proceeding to "Yes" at step S2), the view direction angle and the view angle (FOV: field of view) are renewed based on the input information (step S3).

That is, in the view direction change mode, if the operator manipulates dragging in the right and left direction while pushing a left button, the view direction yaws (yaw rotation) around the y-axis as a center. If the operator manipulates dragging in the up and down direction while pushing the left button, the view direction pitches (pitch rotation) around the x-axis as a center. If a left double clicking is made, the pitch rotation of the view direction returns to the original state such as, e.g., a horizontal state. If the operator manipulates dragging in the right and left direction while pushing the right button, the view direction rolls (roll rotation) around the z-axis as a center. If the operator manipulates dragging in the up and down direction while pushing the right button, the view direction angle increases or decreases. If a right double clicking is made, the roll rotation of the view direction returns to the original state such as, e.g., a horizontal state. A screen renewal processing described below in detail is made at timing that the view direction is thus changed (step S10). Drawing is made in a wide range, and also perspective feeling can be easily expressed, where drawing is made in largely widening the view angle. That is, where the view angel is extremely close to 180 degrees such as, e.g., 140 to 179.75 degrees, drawing at a region remote from the center of the drawing image, or namely near an end of the drawing image, can be expected to provide an expression of, e.g., the ground of a flatland from a far side to a horizon (or perspective feeling such as largely collapsed toward a specific direction).

By overlapping the image for drawing on the screen image based on the synthesizing method and by outputting the image, the most of the drawing result can be confirmed before the omnidirectional image renewal processing starts (steps S11, S12). That is, the view direction angle and the view angle are made adjustable with the overlapped image for drawing as a clue.

The screen image can be reproduced by duplicating in advance the last renewed screen image. This makes the image return to a pre-overlapping state in a short time after overlapping is done to the screen image without performing drawing processing again to the screen image based on the texture image, where no change is made to the view direction information or view angle. This allows screen renewal with high speed in the drawing mode, and is suitable for real time overlapping of the image for drawing.

Where it is judged as not view direction change mode (proceeding to "No" at step S2), a judgment is made as to whether it is in the drawing mode (step S4). If it is in the drawing mode (proceeding to "Yes" at step S4), the drawing parameters and the synthesizing method are selected (step S5), and the image for drawing is drawn based on the input information (step S6). That is, in the drawing mode, by dragging in a region of the screen image while pushing the left button, the pixels of the image for drawing corresponding to the dragged coordinate are renewed based on the drawing parameters (such as, e.g., color information, and line width). Drawing is available in use of a freehand means reflecting input coordinates as they are, and other plural means such as straight line, rectangular, grid, oval, etc. If the right button is pushed in the region of the screen image, the color information of the drawing parameters is changed to the same color information as that of the pixels of the image for screen corresponding to the dragged coordinates.

By overlapping the image for drawing on the screen image based on the synthesizing method and by outputting the image, the most of the drawing result can be confirmed before the omnidirectional image renewal processing starts (steps S11, S12). Drawing work efficiency can be expected to be improved by overlapping the image for drawing at a real time during drawing. As a method switching between the drawing mode and the view direction change mode, exemplified is a method for preparing a button or buttons for switching on a control screen.

If it is not the drawing mode (proceeding to "No" at step S4), a judgment is made as to whether the drawing mode finishes (step S7). As a condition regarded as the end of the drawing mode, timing that the left button of the mouse is released during dragging may be used; the condition is not limited to this; for example, a button executing an ending processing for drawing may be prepared. If the timing ending the drawing is selectable, it is possible to return to the view direction change mode again before ending of the drawing after the image for drawing is drawn. That is, the view direction angle and the view angle are adjustable while overlapping the image for drawing in a way as described above.

When the drawing is regarded as the end (proceeding to "Yes" at step S7), the omnidirectional image renewal processing described below in detail is executed (step S8), and the image for drawing is deleted (step S9). It is desirable to automatically return to the drawing mode after the end of the drawing because a subsequent drawing can be done immediately. If the omnidirectional image renewal processing takes so much time, it may disturb the smooth drawing manipulation as not receiving the subsequent drawing manipulation immediately. To prevent this from occurring, an image for buffering having the same size as that of the image for drawing is used, and tasks of the processors may be assigned in a dividing manner to conduct the drawing processing and the omnidirectional image renewal processing in parallel.

Subsequently, the screen renewal processing described below in detail is executed (step S10). The image for drawing is overlapped on the screen image based on the synthesizing method, and the image is outputted (steps S11, S12). Overlapping of the image for drawing at the end of the drawing is meaningless in fact, because the image for drawing is deleted (erased) in advance under the condition of many situations except conducting in parallel the drawing processing and the omnidirectional image renewal processing and is in a perfectly transparent state.

The omnidirectional image can be renewed and displayed at a real time by shifting to the processing of ending the drawing immediately and returning to the drawing mode again after some renewal is made to the image for drawing during the drawing mode, in a case that the omnidirectional image renewal processing can be completed in a short time such as, e.g., 10 milliseconds or less using a high speed image processing means done by hardware or the like as well as in a case that it is unnecessary to return to the view direction change mode before the end of the drawing. Drawing work efficiency can be improved with those steps without overlapping the image for drawing.

The manipulating method and operation described above are no more than the examples, and this invention is not limited to those, so that other manipulating methods may be adapted or added as a matter of course.

Figure 7:
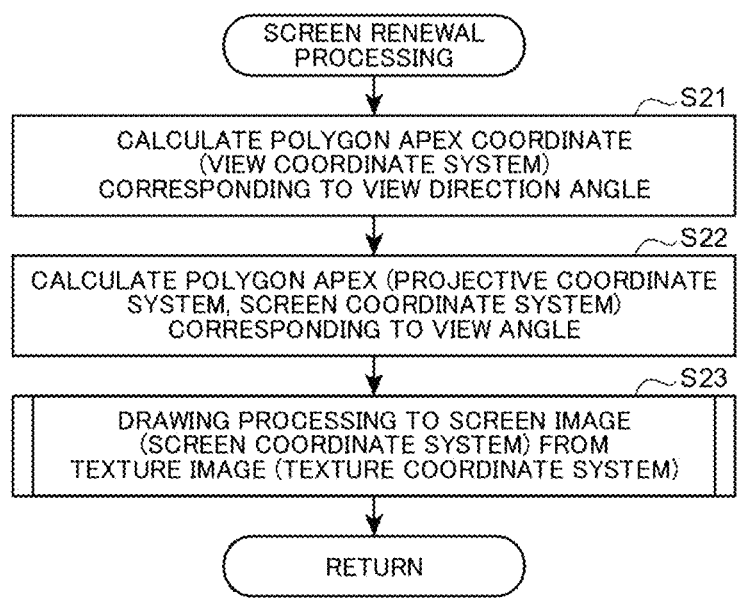
FIG. 7 is a flowchart describing in detail a screen renewal processing executed at step S10 in FIG. 6.

Next, referring to the flowchart in FIG. 7, the screen renewal processing executed at step S10 in FIG. 6 is described in detail. Herein, it is presumed that a polygon model is used.

In this screen renewal processing, first, coordinates of the polygon apexes (view coordinate system) corresponding to the view direction angle are calculated (step S21), and coordinates of the polygon apexes (projective coordinate system, screen coordinate system) corresponding to the view angle are calculated (step S22). Then, as described below in detail, drawing processing to the screen image (screen coordinate system) based on the texture image (texture coordinate system) is performed (step S23), and returning is made.

The drawing processing to the screen image based on the texture image can use substantially the same method as that used in the prior art texture mapping. It is to be noted that even in a case that no polygon model is used, the drawing processing to the screen image based on the omnidirectional image can be made by seeking the direction corresponding to the respective pixels based on the view direction angle and the view angle and by rendering the coordinate conversion based of the direction pixel relationship data.

Figure 8:
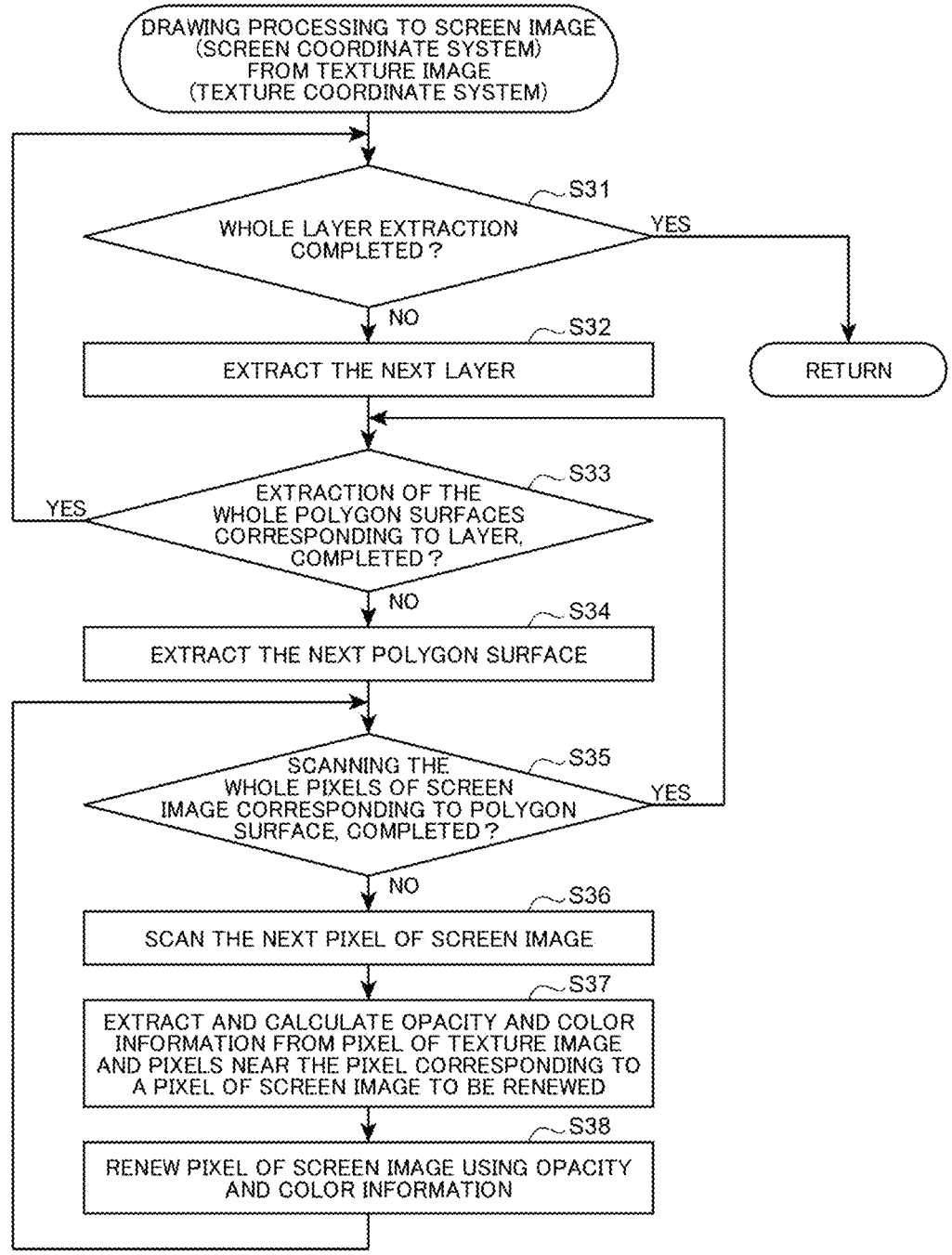
FIG. 8 is a flowchart describing a drawing processing from a texture image (texture coordinate) to a screen image (screen coordinate) executed at step S23 in FIG. 7.

Referring to a flowchart in FIG. 8, hereinafter, a flow of the drawing processing to the screen image (screen coordinate system) based on the texture image (texture coordinate system) executed at step S23 in FIG. 7 is described. Here shows a renewing method for screen images actually observed by the operator.

When this drawing processing to the screen image (screen coordinate system) based on the texture image (texture coordinate system) is started, a judgment is made as to whether extraction of the whole layers is completed (step S31), and if it is judged as the extraction of the whole layers is not yet completed (proceeding to "No," at step S31), the next layer is extracted (step S32), and a judgment is made as to whether extraction of the whole polygon surfaces corresponding to the layer is completed (step S33). If it is judged as the extraction the whole polygon surfaces corresponding to the layer is not yet completed (proceeding to "No," at step S33), the next polygon surface is extracted (step S34), and a judgment is made as to whether scanning the whole pixels corresponding to the polygon surface on the screen image is completed (step S35).

At step S35, if scanning the whole pixels is yet completed (proceeding to "No," at step S35), the next pixel of the screen image is scanned (step S36), and opacity and color information is extracted from a pixel of the texture image corresponding to a pixel of the screen image to be renewed as well as from pixels near the pixel of the texture image and is calculated (step S37). The pixel of the screen image is renewed using the opacity and color information (step S38), and the program returns to step S35.

To the contrary, if scanning the whole pixels is completed (proceeding to "Yes," at step S35), the program returns to the step S33, and repeats the above processing. Thus, when the extraction of the whole polygon surfaces corresponding to the layer is completed (proceeding to "Yes," at step S33), and when the extraction of the whole layers is completed (proceeding to "Yes," at step S31), returning is made.

It is to be noted that calculations for image drawing can be made by using specific hardware in lieu of the central control unit. Image quality may be improved by bilinear filtering or the like when drawing the screen images. A single image unifying copies of the whole layers is produced in advance in lieu of drawing the whole layers at each drawing processing, and the single image can be regarded as a texture to make drawing to the screen image. In this situation, the unified image is produced at the end of the texture image renewal, which is done after drawing.

Figure 9:
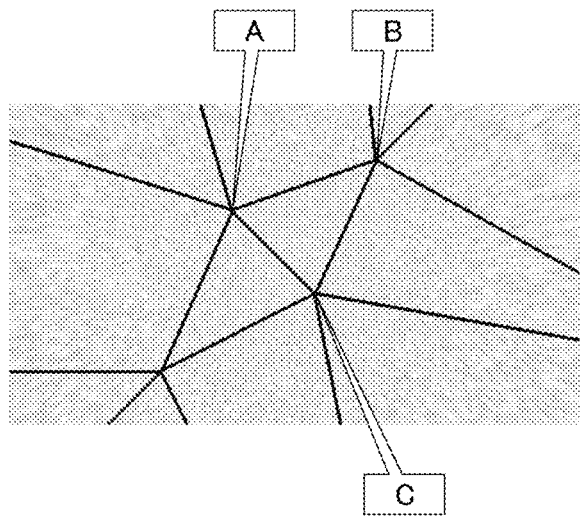
FIG. 9 is a diagram showing an example using arbitrary view direction from a center of the polygon model, overlapping an upper layer texture on a lower layer texture, and being projected to a screen image.

FIG. 9 shows an example in which the upper layer texture overlapped on the lower layer texture is projected to the screen image in use of an arbitrary view direction from the center of the polygon model. It is provided that this shows a state showing only the lower layer texture as a result because the upper layer texture is perfectly transparent. Although in FIG. 9 the boundaries of the polygon surfaces are indicated with solid lines to let the positional relationships of the screen image of the apexes at the polygon surface unit understood easily, such solid lines are not required to be drawn actually.

Referring to a flowchart in FIG. 10, the omnidirectional image renewal processing executed at step S8 in FIG. 6 is described next in exemplifying a case using a polygon model.

When the omnidirectional image renewal processing is started, first, the coordinate of the polygon apex corresponding to the view direction angle (view coordinate system) is calculated (step S41), and then, the coordinate of the polygon apex corresponding to the view angle (projective coordinate system, screen coordinate system) is calculated (step S42). Then, the drawing processing to the texture image (texture coordinate system) based on the image for drawing (screen coordinate system) is made as described below in detail (step S43). The texture image corresponding to an end of the polygon surface is complemented (step S44), and this processing ends as makes return. Thus, the input and output relation at the coordinate conversion is reversed with respect to the projection used in the screen renewal processing.

According to some drawing means, an end portion as the boundary of the polygon surfaces is not drawn, or may become unnatural. With respect to such a pixel, a natural boundary is desirable by making complementing with neighbor pixels according to a proper method.

Even where no polygon model is used, drawing to the omnidirectional image based on the image for drawing is desirable by seeking a direction with respect to each pixel of the omnidirectional image based on direction pixel relationship data, converting the direction to the screen coordinate when the direction in within the view angle, and seeking a pixel of the image for drawing corresponding to the coordinate and neighbor pixels.

Figure 10:
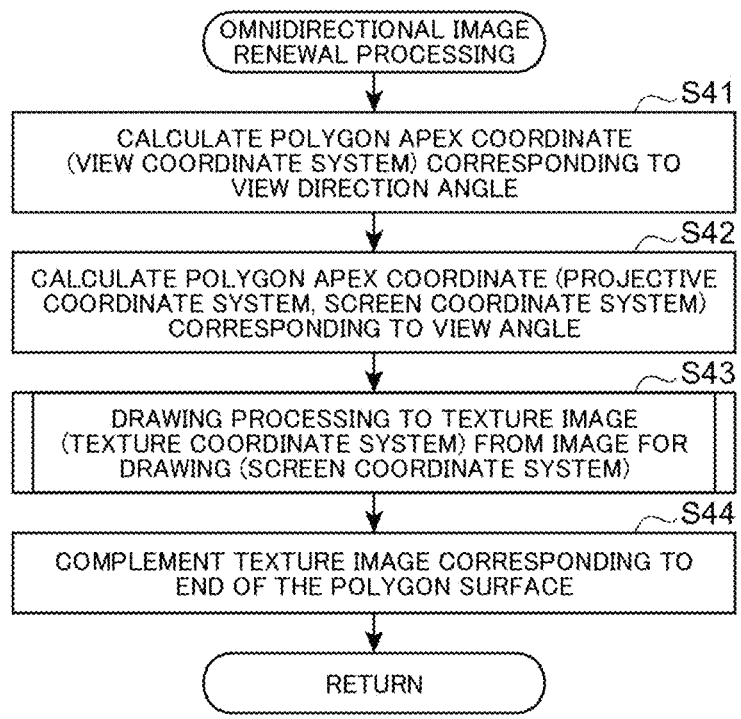
FIG. 10 is a flowchart describing an omnidirectional image renewal processing executed at step S8 in FIG. 6 in exemplifying a case using a polygon model.
Figure 11:
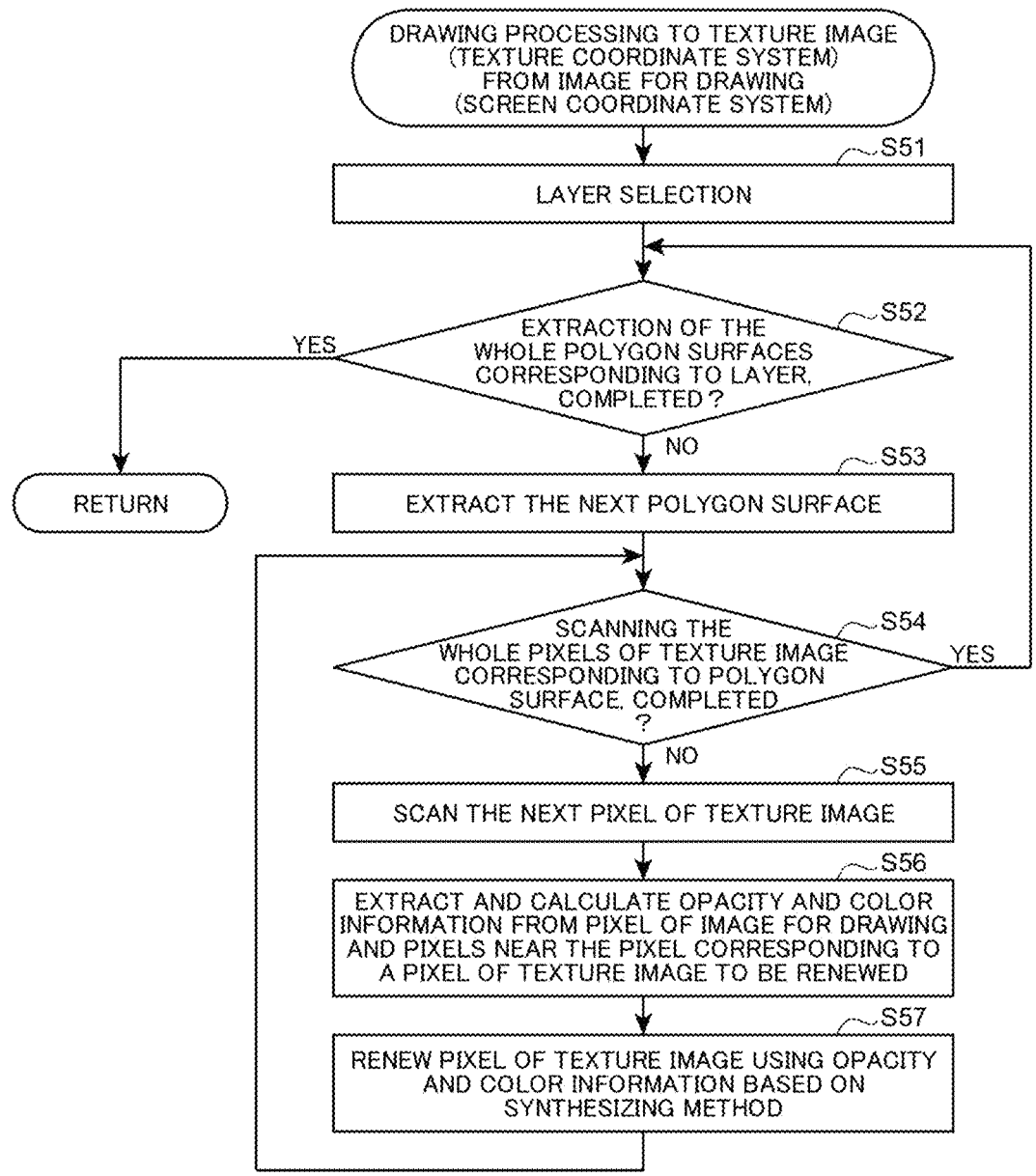
FIG. 11 is a flowchart describing a flow of a drawing processing from a texture image (texture coordinate) to an image for drawing (screen coordinate) executed at step S43 in FIG. 10.

Referring to a flowchart in FIG. 11, a flow of the drawing processing to the texture image (texture coordinate system) based on the image for drawing (screen coordinate system) executed at step S43 in FIG. 10, is described next. This shows a method for reflecting drawing contents done by the operator to the texture of the selected layer.

The layer is selected (step S51), and a judgment is made as to whether extraction of the whole polygon surfaces corresponding to the layer is completed (step S52). If the extraction is not completed (proceeding to "No," at step S52), a subsequent polygon is extracted (step S53), and a judgment is made as to whether scanning the whole pixels corresponding to the pixel of the texture image to be renewed is completed (step S54).

If it is judged that scanning the whole pixels is not yet completed (proceeding to "No," at step S54), the next pixel of the texture image is scanned (step S55), and opacity and color information is extracted and calculated from the pixel of the image for drawing corresponding to the pixel of the texture image to be renewed and the neighbor pixels (step S56). Using the opacity and color information, the pixel of the texture image is renewed based on the synthesizing method (step S57), and the program proceeding returns to step S54.

To the contrary, if it is judged that scanning the whole pixels corresponding to the polygon surface in the texture image at step S54 is completed (proceeding to "Yes," at step S54), the program proceeding returns to S52. If it is judged that extraction of the whole polygon surfaces corresponding to the layer is completed (proceeding to "Yes," at step S52), and the program proceeding makes returning.

It is to be noted that the method for synthesizing the image for drawing to the texture image can be selectable from, in addition to a standard synthesizing method, a synthesizing or deleting method for reducing the opacity, and a synthesizing or dodging method such that color values are multiplied. The processing for drawing images can be done with specific hardware in lieu of the central control unit. Images may be improved by bilinear filtering when drawing the texture images.

Figure 12:
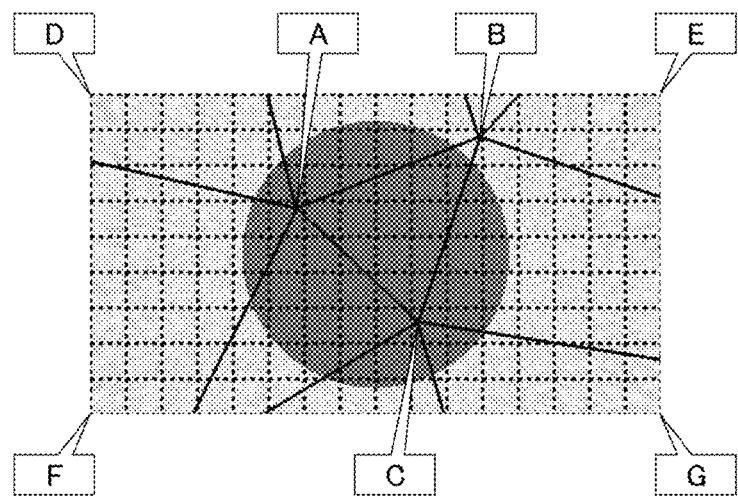
FIG. 12 is a diagram showing an example of drawing.

FIG. 12 shows an example of drawing. That is, FIG. 12 shows the example that a semi-transparent circle and grid-shape broken lines. The image for drawing is overlapped according to a standard synthesizing method onto the screen image to which the polygon model is projected.

Figure 13:
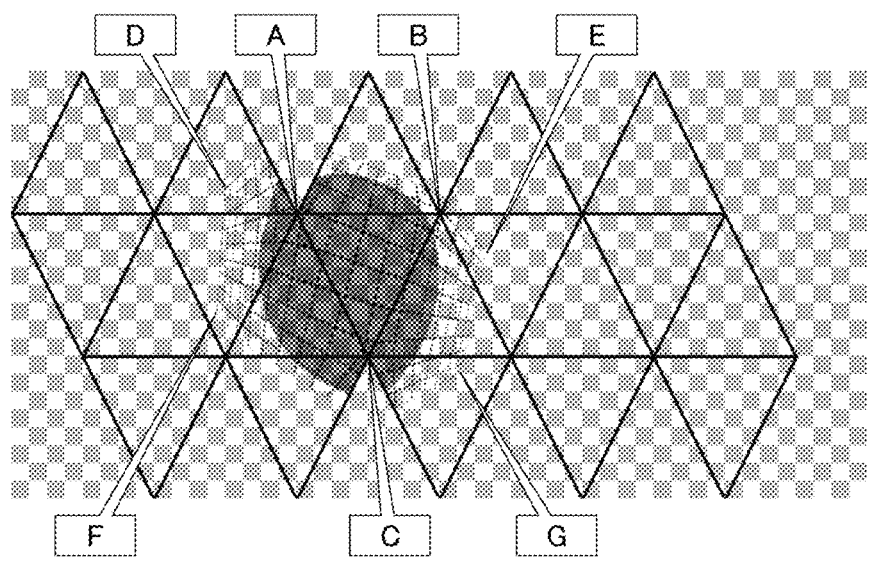
FIG. 13 is a diagram showing a drawing result.

FIG. 13 shows a drawing result. That is, FIG. 13 shows the upper layer texture image in a renewed state by the standard synthesizing method according to the drawing processing to the texture image (texture coordinate system) based on the image for drawing (screen coordinate system) as shown in FIG. 11.

Figure 14:
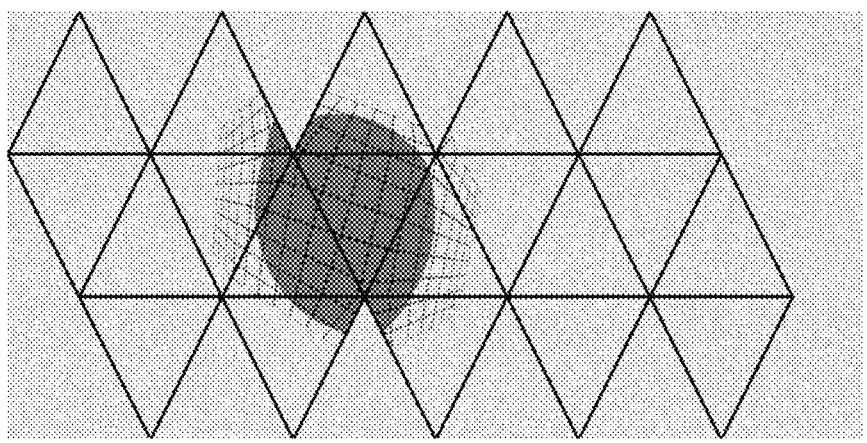
FIG. 14 is a diagram showing a state in which an upper layer texture image is coupled to a lower layer texture image.

FIG. 14 shows a situation in which the upper layer texture image is unified with the lower layer texture image. Where no independency of the layers is required, the layers can be united mutually. FIG. 14 is an example in which the upper layer texture is unified with the lower layer texture. At that time, the united one is usable as a new layer by erasing the united layer, or the upper layer in this case.

Figure 15:
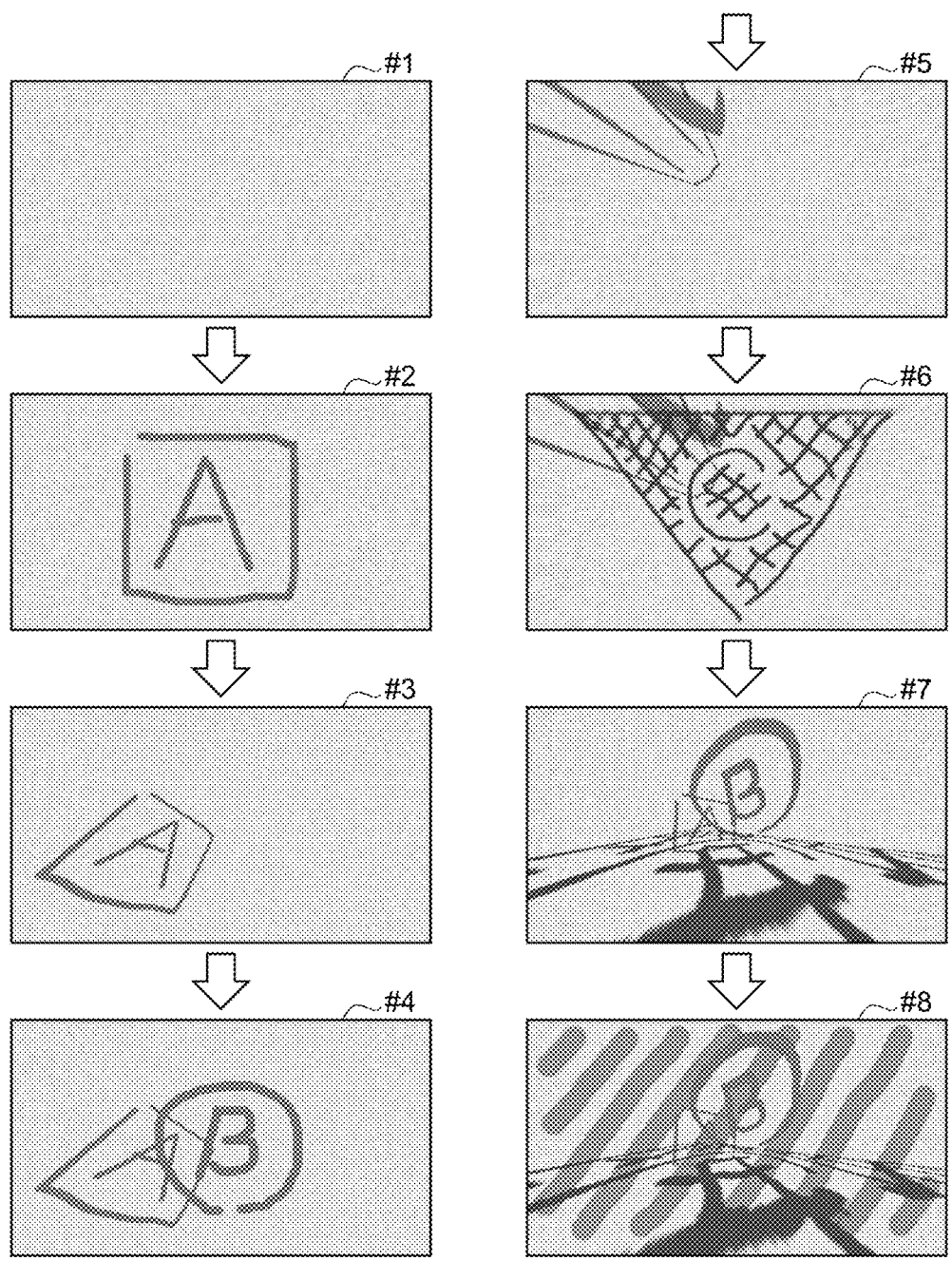
FIG. 15 is an illustration showing a transition of a screen image observable by an operator for describing working steps.

FIG. 15 shows a transition of a screen image observable by the operator, and working steps are described herein. The viewpoint is at a center of the cubic polygon model; the texture is made of two layers, the upper layer and the lower layer; the lower layer texture adapts an untransparent random noise pattern while the upper layer texture adapts perfect transparency.

Figure 16:
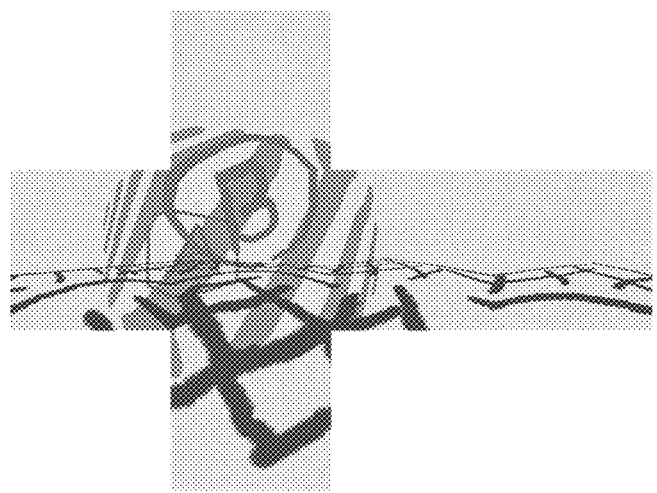
FIG. 16 is an illustration showing a state of a produced texture image (already the upper layer texture is coupled with the lower layer texture)
Figure 17:
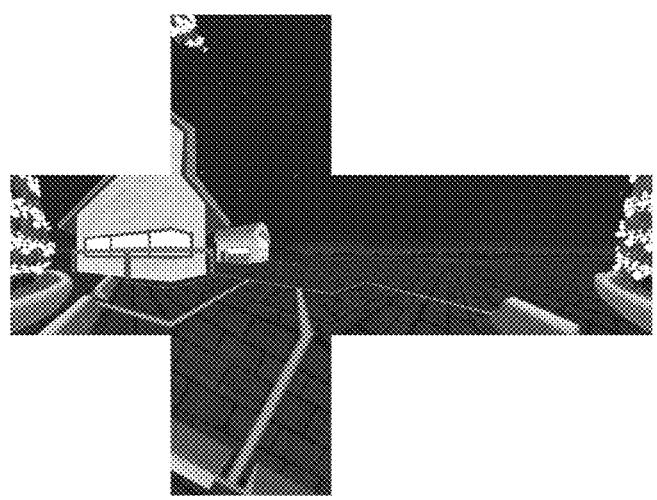
FIG. 17 is an illustration showing a work example.

With this example, from an initial state (#1), an upper texture is selected; letter "A" is drawn, and this drawing ends (#2); letter "B" is drawn after change of the view direction (#3), and this drawing ends (#4); letter "C" is drawn after change of the view direction (#5), and this drawing ends (#6); a lower layer texture is selected after change of the view direction (#7); oblique lines are drawn, and the drawing ends (#8), A state of the texture image thus created, in which the upper layer texture is already unified with the lower layer texture, is shown in FIG. 16. A work product example is shown in FIG. 17.

Figure 18:
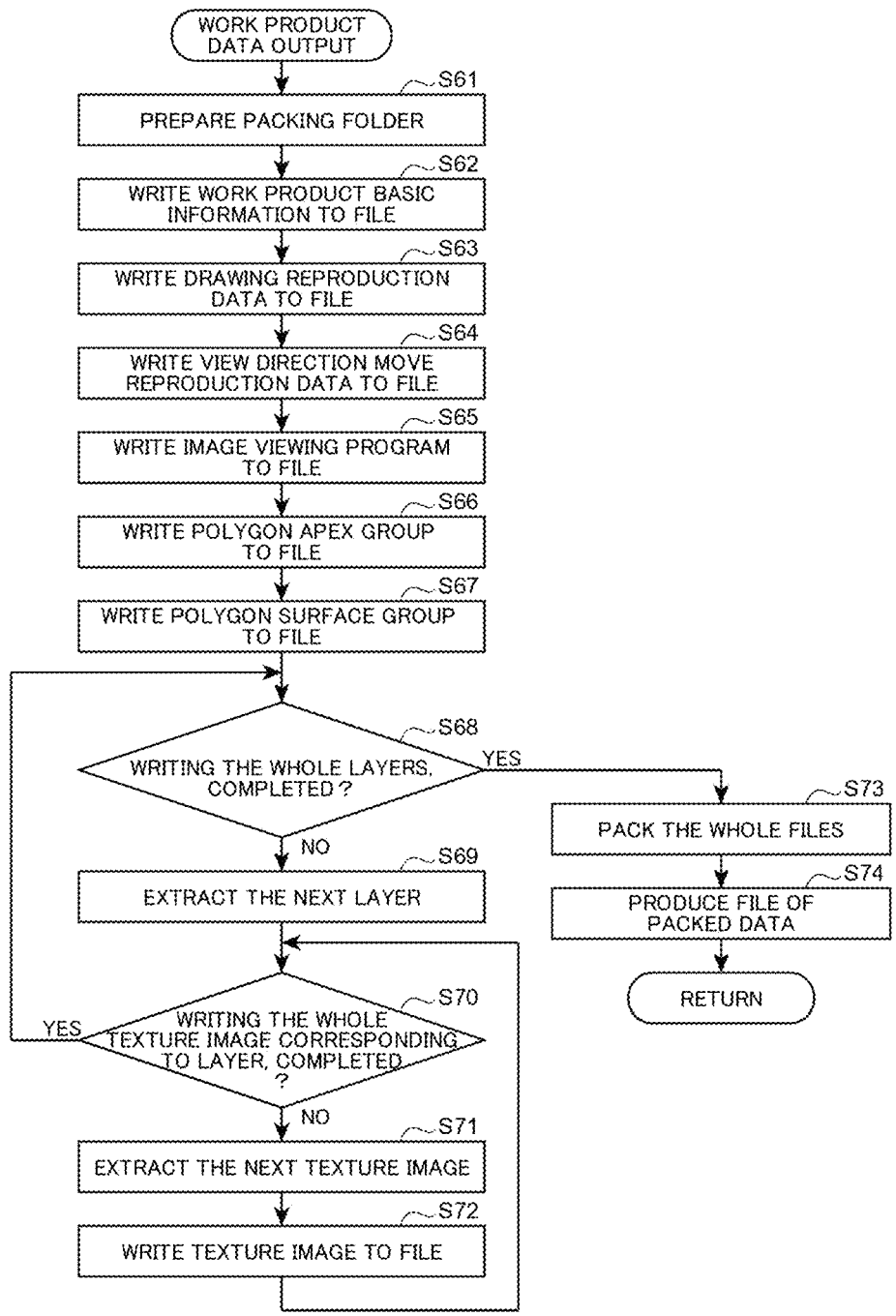
FIG. 18 is a flowchart showing a flow of processing outputting data as a work data to a file with the omnidirectional image editing apparatus according to the embodiment of the invention.

Referring to a flowchart in FIG. 18, a flow of processing for outputting work product data to a file by means of the omnidirectional image editing apparatus according to the embodiment of the invention is shown and described.

As an example, the work product data include all of work product basis information, drawing reproduction data, view direction move data, image viewing program, polygon apex groups, polygon surface groups, and texture images, and the work product data can be read from the editing apparatus to continue the editing steps. If a viewing apparatus exists, observers may view the work product data.

When this processing starts, a packing folder is prepared (step S61), and the work product basic information is written into a file (step S62). The work product basic information (metadata) means information including, e.g., data types contained in the work product data and authors of the work products. Subsequently, drawing reproduction data are written into the file (step S63). The drawing reproduction data are sequence data for reproducing drawing steps of the operator. The drawing reproduction data may include such as, view direction information at a time of drawing, drawing parameters, synthesizing methods to texture images based on drawing images, selected layers, sequences of timings of the end of drawing, etc.

The view direction move reproducing data are written into the file (step S64). The view direction move reproducing data are sequence data for automatically performing looking around, and provide a camera work for rendering the work product effectively visualize. Then, an image viewing program is written into the file (step S65). The image viewing program means a program for rendering viewers viewable in a stand-alone manner without requiring any external viewing program.

Subsequently, the polygon apex group is written into the file (step S66); the polygon surface group is written into the file (step S67); a judgment is made as to whether writing the whole layers is completed (step S68). If it is judged that writing the whole layers is not yet completed (proceeding to "No," at step S68), the next layer is extracted (step S69), and a judgment is made as to whether writing the whole texture images corresponding to the layer is completed (step S70). If it is judged that writing the whole texture images corresponding to the layer is not yet completed (proceeding to "No," at step S70), the next texture image is extracted (step S71), and the texture image is written to the file (step S72), and the program proceeding returns to step S70.

If it is judged that writing the whole texture images corresponding to the layer is completed (proceeding to "Yes," at step S70), the program proceeding returns to step S68. If it is judged that writing the whole layers is completed (proceeding to "Yes," at step S68), the whole files are packed (step S73), and a file for the packed data is produced (step S74), and returning is made. The term "pack" means a processing to compress the data contained in the work product data and to convert the work product data to a file easily distributable. For example, this is comparable to a processing for converting the data to those in a ZIP file format or the like.

It is to be noted that the types of the data contained actually as the work product data can be selectable by the operator when necessary. For example, it is presumed that viewers only and simply look around the work product data with a viewing apparatus. In such a situation, drawing is redundant and is not required, By unifying the layers of the texture image, the number of the texture images is reduced, thereby reducing loads for unifying the layers on a side of the viewing apparatus. Where the work product data are distributed as of widely used file format, the folder containing all the produced files, itself can make the work product data without compressing any data.

Figure 19:
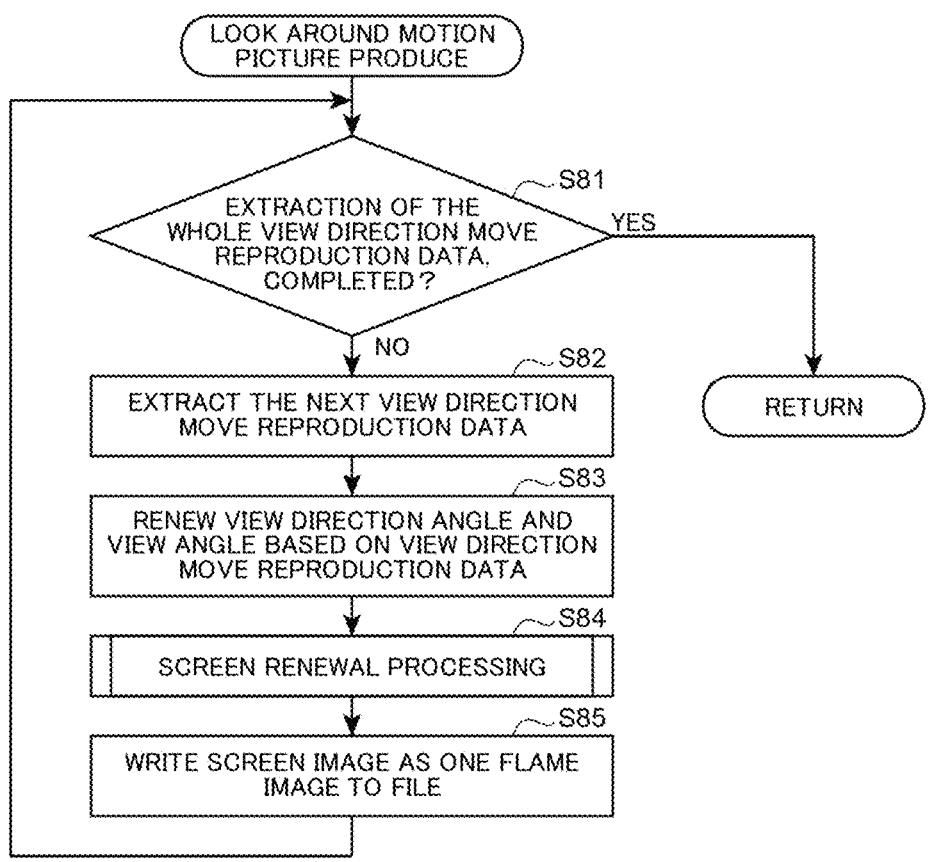
FIG. 19 is a flowchart describing steps for producing a looking-around motion picture as a movie with the omnidirectional image editing apparatus according to the embodiment of the invention.

Referring to a flowchart in FIG. 19, steps for producing a look-around motion picture as a movie with the omnidirectional image editing apparatus according to the embodiment of the invention are described next.

When the processing is started, a judgment is made as to whether extraction of the whole view direction move reproduction data is completed (step S81). If it is judged that it is not yet completed (proceeding to "No," at step S81), the next view direction move reproduction data are extracted (step S82), and the view direction angle and the view angle are renewed based on the view direction move reproduction data (step S83), thereby executing the screen renewal processing (step S84). Then, the screen image is written to a file as one frame image, and the program proceeding returns to step S81. When the extraction of the whole view direction move reproduction data is completed (proceeding to "Yes," at step S81), returning is made.

Thus, in this processing, the view direction is moved little by little by one frame according to the data reproducing the view direction move to draw the respective frames as well as to write those into files. Exemplified as the file format are general movie formats as represented with AVI, MPG, MOV, etc., and formats of sequential image file groups, but the usable formats are not limited to these.

Figure 20:
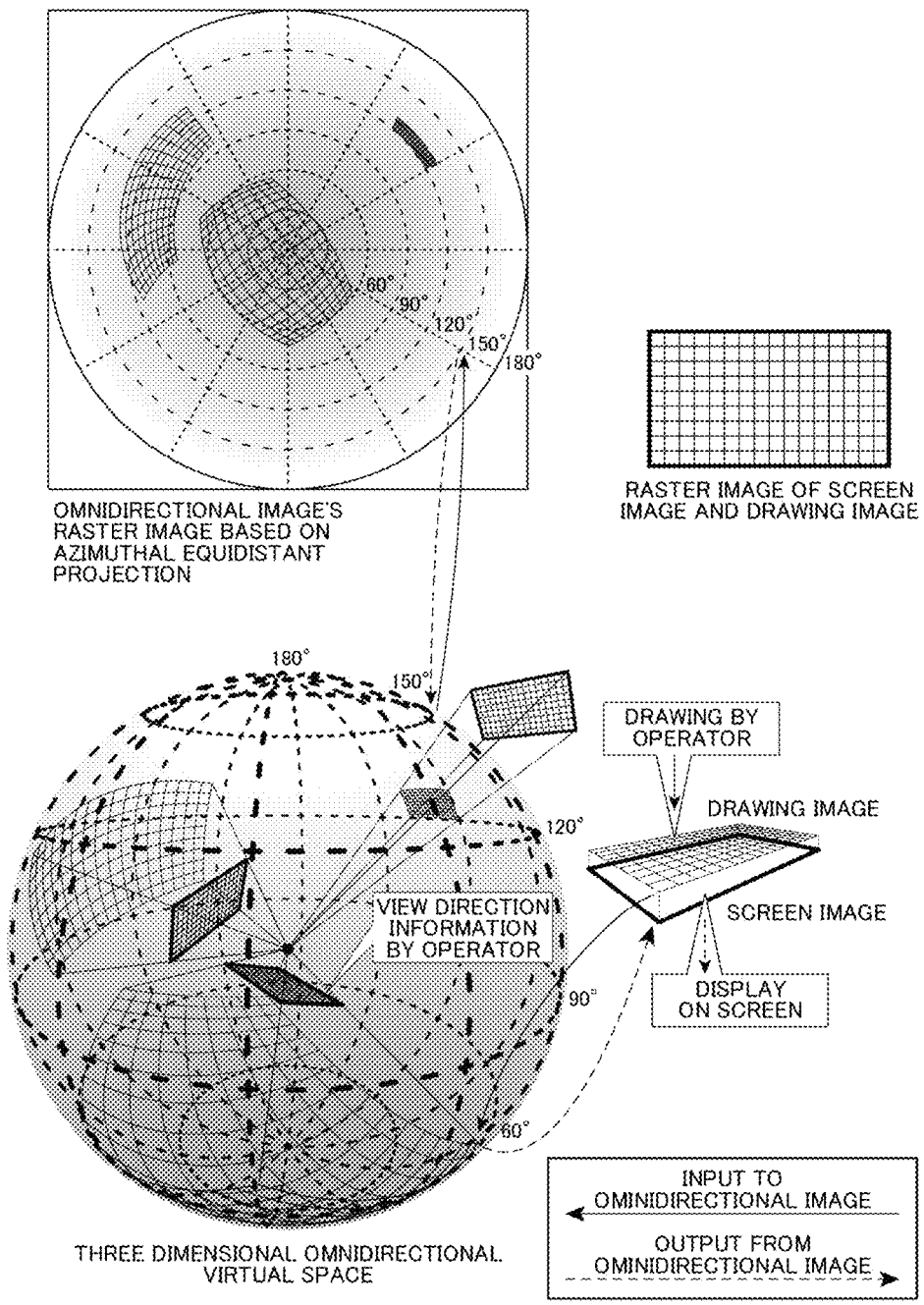
FIG. 20 is an illustration describing a coordinate concept.

Referring to FIG. 20, the concept of the coordinate conversion is described. On an upper side thereof, a raster image of the omnidirectional image based on the azimuthal equidistant projection is shown. On a lower side thereof, a three dimensional omnidirectional virtual space is shown. In this omnidirectional virtual space, a raster image of the screen image and the drawing image is shown together. Inputs to the omnidirectional image are shown with solid line arrows whereas outputs from the omnidirectional image are shown with broken line arrows.

Figure 21:
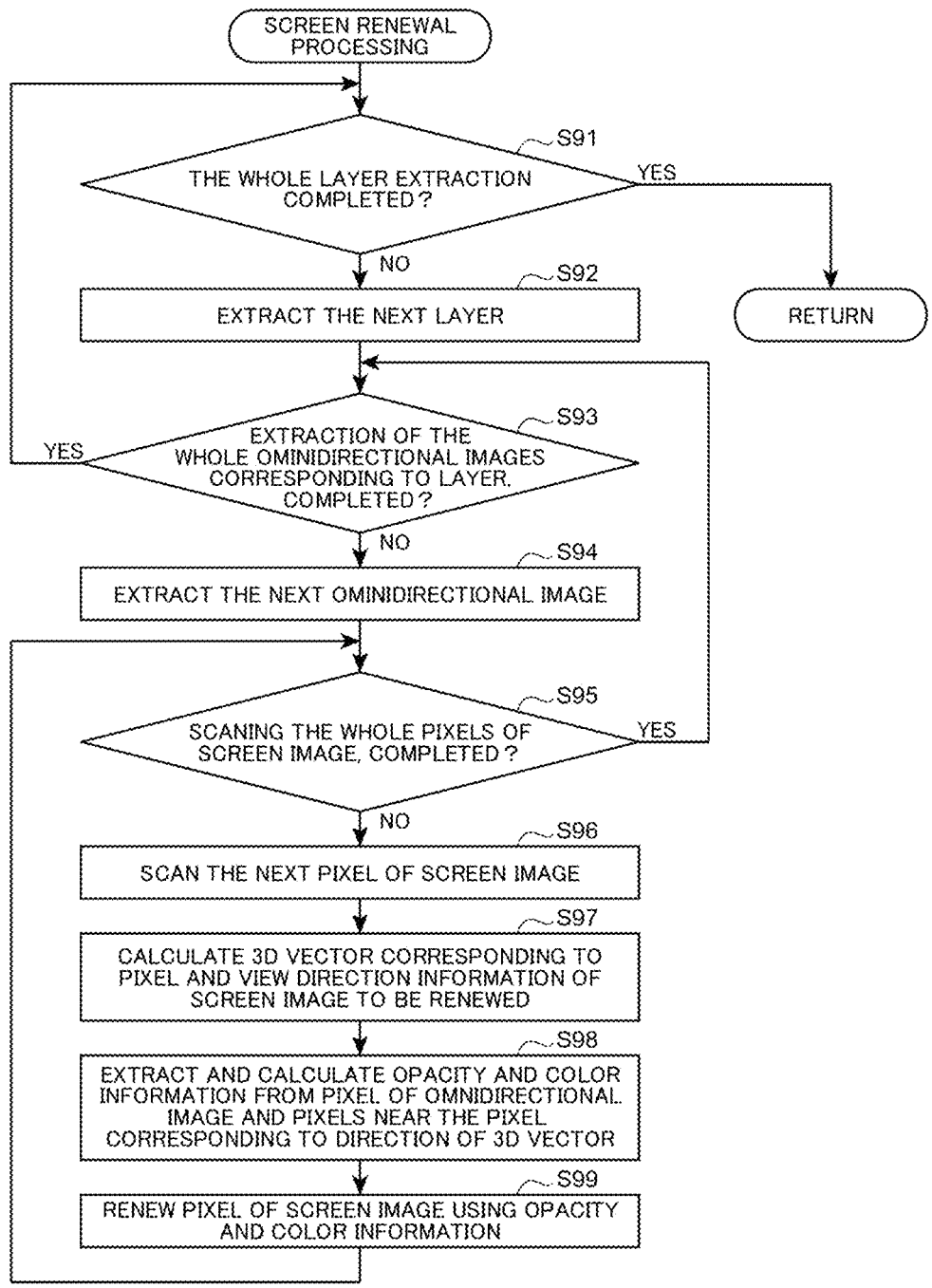
FIG. 21 is a flowchart describing a flow of a drawing processing from an omnidirectional image (arbitrary coordinate system) and view direction information to a screen image (screen coordinate system)

Referring to a flowchart in FIG. 21, a flow of the drawing processing to the screen image (screen coordinate system) from the omnidirectional image (arbitrary coordinate system) and the view direction information is described. Here, a renewing method for screen images observable actually by the operator is shown. This processing is executed where no polygon model is used at step S10 in FIG. 6.

When the screen renewal processing is started, first, a judgment is made as to whether extraction of the whole layers is completed (step S91). If the extraction of the whole layers is not yet completed (proceeding to "No," at step S91), the next layer is extracted (step S92), and a judgment is made as to whether extraction of the whole omnidirectional images corresponding to the layer is completed (step S93). If the extraction is not yet completed, the next omnidirectional image is extracted (step S94), and a judgment is made as to whether scanning the whole pixels is completed in the screen image (step S95).

If it is judged that scanning the whole pixels is not yet completed in the screen image (proceeding to "No," at step S95), scanning the next pixel of the screen image is executed (step S96). A three-dimensional vector corresponding to the pixel and view information of the screen image to be renewed is calculated (step S97), and the opacity and color information is extracted and calculated from the pixel of the omnidirectional image corresponding to the direction of the three-dimensional vector and from the neighbor pixels (step S98). The pixel of the screen image is renewed using the opacity and color information (step S99), and the program proceeding returns to step S95.

If it is judged that scanning the whole pixels in the screen image is completed (step S95), returning to step S93 is made. If it is judged that extraction of the whole omnidirectional images corresponding to the layer is completed (proceeding to "Yes," at step S93), returning to step S91 is made. If it is judged that the extraction of the whole layers is completed (proceeding to "Yes," at step S91), the program proceeding returns.

Now, for example, an example in which an omnidirectional image such as an image obtained from an omnidirectional camera using a sphere mirror is reproduced is considered.

A direction of the three-dimensional vector (x, y, z) corresponding to a pixel (u: horizontal direction, v: vertical direction) and view direction information (yaw angle, pitch angle, roll angle, view angle) of a screen image (w: width, h: height) is sought in use of conventional calculation methods in the art of computer graphics.

Subsequently, for a coordinate conversion to the pixel (u: horizontal direction, v: vertical direction) of the omnidirectional image (w: width, h: height) from the three-dimensional vector (x, y, z), the following calculation methods are used based on the conventional azimuthal equidistant projection method.

Pi is the ratio of a circle's circumference to its diameter;

r is a length of a two-dimensional vector (x, z), sqrt(x*x+z*z);

t is a normalized range of an angle of a two-dimensional vector (y, r) with respect to the x-axis from between 0 degree and 180 degrees then to between 0 and 1, a tan 2 (r, −y)/Pi;

u is (1+x*t/r)*w/2; and v is (1−z*t/r)*h/2

Any calculation method can be used as far as the coordinate conversion between the direction of the three-dimensional vector and the coordinate of the omnidirectional image is possible mutually, notwithstanding the above example.

It is to be noted that executions or operations for drawing images can be done by means of specific hardware in lieu of the central control unit. Image quality can be improved by using bilinear filtering or the like when drawing the screen images. A single image unifying copies of the whole layers is produced in advance in lieu of drawing the whole layers at each drawing processing, and the single image can be regarded as an omnidirectional image to make drawing to the screen image. In this situation, the unified image is produced at the end of the omnidirectional image renewal, which is done after drawing.

Figure 22:
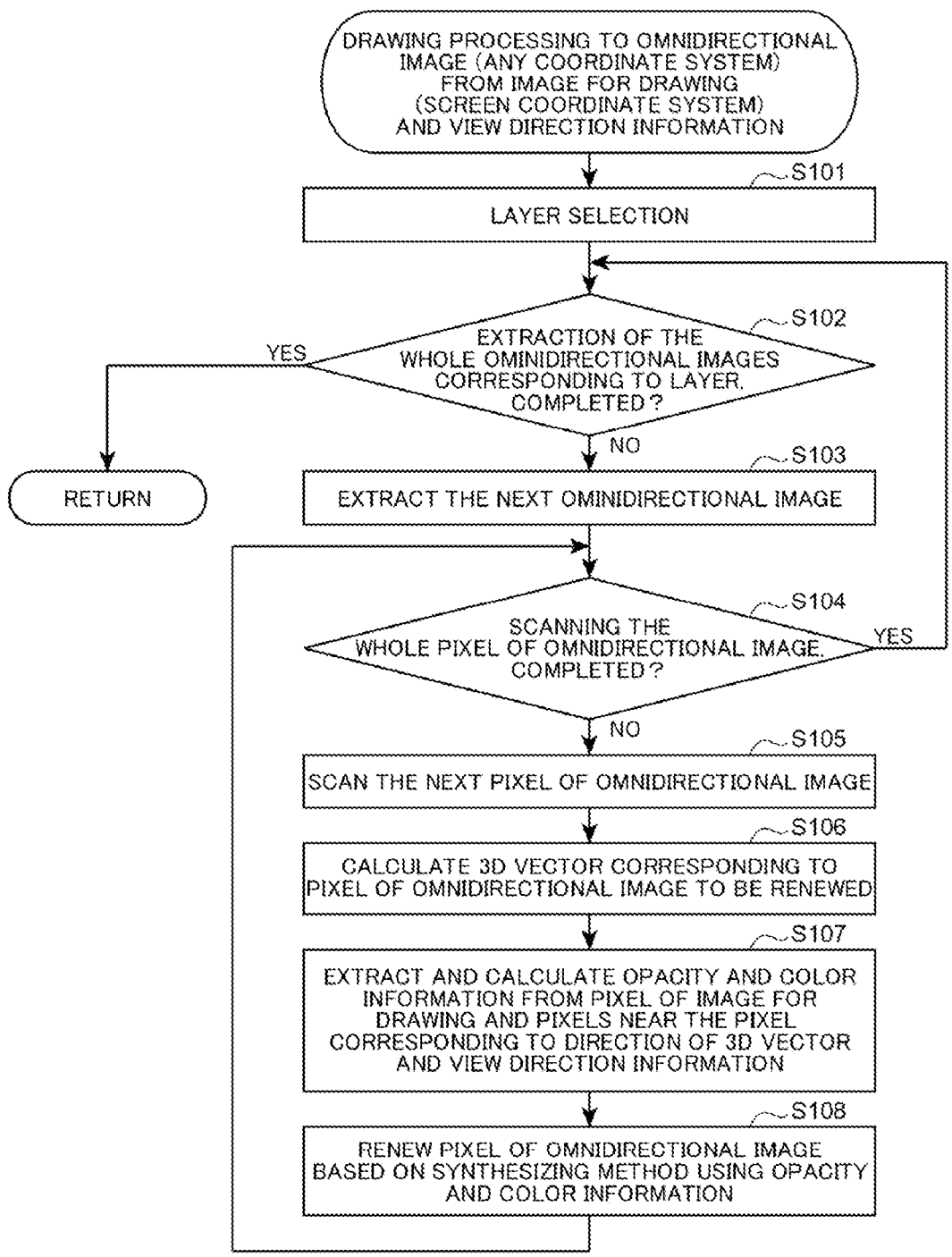
FIG. 22 is a flowchart describing a flow of a drawing processing from an image for drawing (screen coordinate system) and view direction information to an omnidirectional image (arbitrary coordinate system)

Referring to a flowchart in FIG. 22, a flow of the drawing processing to the omnidirectional image (arbitrary coordinate system) based on the image for drawing (screen coordinate system) and the view direction information, is described next. This shows a method for reflecting drawing contents done by the operator to the omnidirectional image of the selected layer. This processing is executed where no polygon model is used at step S8 in FIG. 6.

When this drawing processing starts, the layer is selected (step S101), and a judgment is made as to whether extraction of the whole omnidirectional images corresponding to the layer is completed (step S102). If the extraction of the whole omnidirectional images corresponding to the layer is not yet completed (proceeding to "No," at step S102), a subsequent omnidirectional image is extracted (step S103), and a judgment is made as to whether scanning the whole pixels in the omnidirectional image is completed (step S104).

If it is judged that scanning the whole pixels in the omnidirectional image is not yet completed (proceeding to "No," at step S104), the next pixel of the omnidirectional image is scanned (step S105). Then, a three-dimensional vector corresponding to the pixel of the omnidirectional image to be renewed is calculated (step S106), and opacity and color information is extracted and calculated from the pixel of the image for drawing corresponding to the direction of the three-dimensional vector and the view direction information and the neighbor pixels (step S107). Using the opacity and color information, the pixel of the omnidirectional image is renewed based on the synthesizing method (step S108), and the program proceeding returns to step S104.

If it is judged that scanning the whole pixels corresponding to the omnidirectional image is completed (proceeding to "Yes," at step S104), the program proceeding returns to S102. If it is judged that extraction of the whole omnidirectional image corresponding to the layer is completed (proceeding to "Yes," at step S102), and the program proceeding makes returning.

An example in which an omnidirectional image such as an image obtained from an omnidirectional camera using a sphere mirror is reproduced is considered again.

In regarding the coordinate conversions, for a coordinate conversion from the pixel (u: horizontal direction, v: vertical direction) of the omnidirectional image (w: width, h: height) to the three-dimensional vector (x, y, z), the following calculation methods are used based on the conventional azimuthal equidistant projection method. That is, this is equivalent to the reverse coordinate conversion to the coordinate conversion from the direction of the three-dimensional vector to the pixel of the omnidirectional image.

Pi is the ratio of a circle's circumference to its diameter;
nu is a normalized range of "u" from between 0 to w to between −1 and +1, 2*u/w−1;
nv is a normalized range of "v" from between h to 0 to between −1 and +1, 1−2*v/h;
r is a length of the two-dimensional vector (nu, nv), sqrt(nu*nu+nv*nv);
x is nu*sin(r*Pi)/r;
y is −cos(r*Pi); and
z is nv*sin(r*Pi)/r Any calculation method can be used as far as the coordinate conversion between the direction of the three-dimensional vector and the coordinate of the omnidirectional image is possible mutually, notwithstanding the above example.

A pixel (u: horizontal direction, v: vertical direction) of a screen image (w: width, h: height) corresponding to a direction of the three-dimensional vector (x, y, z) and view direction information (yaw angle, pitch angle, roll angle, view angle) is sought in use of conventional calculation methods in the art of computer graphics.

It is to be noted that the method for synthesizing the image for drawing to the omnidirectional image can be selectable from, in addition to a standard synthesizing method, a synthesizing or erasing method for reducing the opacity, and a synthesizing or dodging method such that color values are multiplied. The processing for drawing images can be done with specific hardware in lieu of the central control unit. Images may be improved by bilinear filtering when drawing the omnidirectional images.

Figure 23:
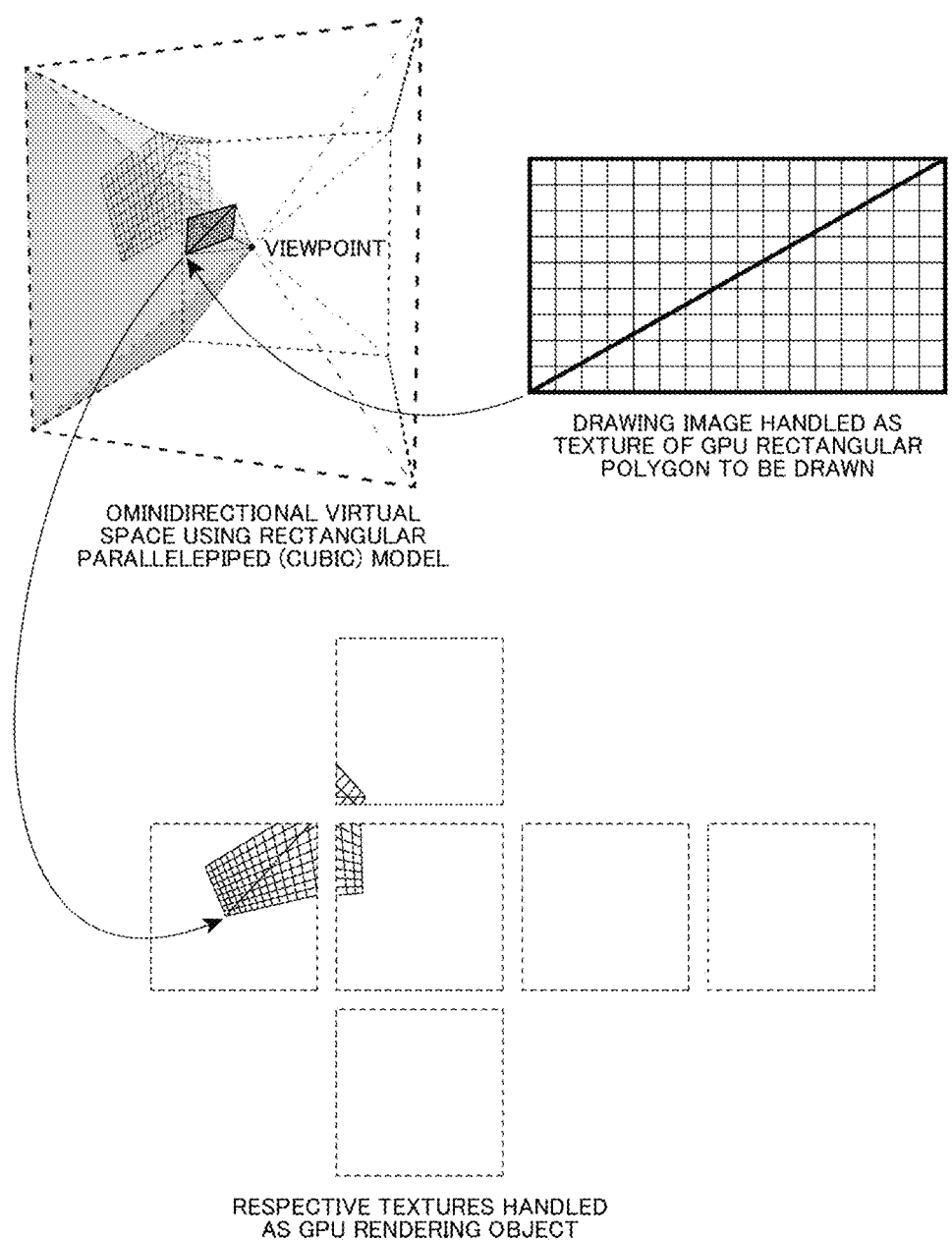
FIG. 23 is an illustration showing an omnidirectional image renewal processing using a rectangular parallelepiped model or a cubic model.

FIG. 23 shows a concept diagram of the omnidirectional image renewal processing using a rectangular parallelepiped model or cubic model and describes the processing.

Where in a method using a polygon model, the respective surfaces are in a rectangular shape, it can make mounting easily using a GPU (Graphics Processing Unit). In a case where a rectangular parallelepiped model or cubic model is used, the center of the model becomes a viewpoint as "indication of the omnidirectional image," and all of the six surfaces having the texture are rendered to the screen image. To the contrary, where "renewal of the omnidirectional image" is made, the texture of the respective surfaces is subject to rendering. The means for rendering is as follows.

A rectangular pyramid corresponding to view direction information containing a view angle as shown in the drawing is produced. At that time, the drawing image is regarded as a rectangular bottom surface, and the viewpoint is regarded as an apex facing the rectangular bottom surface and is located at a center of the rectangular parallelepiped model. The drawing image is handled as a texture of a GPU rectangular polygon to be drawn. The six rectangular surfaces of the rectangular parallelepiped model are extracted. The "upper edge," the "lower edge," the "right side edge," and the "left side edge" of the rectangular surface are defined in advance.

The texture of the respective rectangular surfaces is regarded as the object (target) for GPU rendering. For the view direction angle at a time of the GPU view conversion, the view direction is a direction proceeding from "the viewpoint" to "the center of the rectangular surface." An upper direction of the view direction is a direction proceeding from "the center of the rectangular surface." to "a midpoint of the upper edge of the rectangular surface." The view angle at a time of GPU projection conversion is an angle formed from "a midpoint of the upper edge of the texture image," "the viewpoint," "a midpoint of the lower edge of the texture image." An aspect ratio at the time of GPU projection conversion is set as a width of the rectangle surface of the rectangular parallelepiped model to a length thereof. If the rectangular parallelepiped model is cubic, the view angle at the time of GPU projection conversion is 90 degrees, and the aspect ratio is one (1).

Hereinafter, referring to a flowchart in FIG. 24, a flow of the omnidirectional image renewal processing using a rectangular parallelepiped model or cubic model is shown and described.

When this processing is started, first, a layer is selected (step S111), the viewpoint is set at the original point whereas the z-coordinate is set as one (1). A rectangular polygon (coordinate information is x, y, z and u, v) according to the view angle and the aspect ratio during the observation is produced as GPU polygon data (step S112), and the drawing image (pixel color information is a, r, g, and b) is set as a GPU texture (step S115).

Subsequently, a judgment is made as to whether extraction of all of the six surfaces of the rectangular parallelepiped model surface (rectangular) is completed (step S114). If it is judged that the extraction of all of the six surfaces is not yet completed (proceeding to "No," at step S114), the rectangular parallelepiped model surface (rectangular) is extracted (step S115); a texture image corresponding to the rectangular parallelepiped model surface is set as a GPU rendering object (step S116); a direction of the view direction and an upper direction of the view direction are produced from the positional relationship between the viewpoint and the rectangular parallelepiped model surface; the data are set as a GPU view matrix (step S117); a view angle and an aspect ratio are produced from the positional relationship between the viewpoint and the rectangular parallelepiped model surface, and the data are set as a GPU projection matrix (step S118); the GPU polygon data are subject to rendering (step S119), and returning to step S114 is made.

Thus, if it is judged that the extraction of all of the six surfaces of the rectangular parallelepiped model surface is completed (proceeding to "Yes," at step S114), returning is made.

As described above, according to the embodiment of the invention, the omnidirectional image editing apparatus is provided in including the pointing device 30 serving as a manipulation input unit for receiving an input for a manipulation, the display device 20 serving as a displaying unit for displaying a variety of images; and the central control unit 11 serving as a central control means for making a control in accordance to an omnidirectional image editing program, wherein the central control unit receives at least information of a coordinate and a button input from the manipulation input unit, wherein the central control unit, in a case of a view direction change mode, performs renewing a view direction angle and a view angle based on the input information, doing a screen renewal processing, and outputting an image to the displaying unit, in a case of a drawing mode, selects at least a drawing parameter and makes drawing on an image for drawing based on the drawing parameter, and, in a case of a completion of drawing, performs executing an omnidirectional image renewal processing, deleting the image for drawing, doing a screen renewal processing, and outputting an image to the displaying unit.

The central control unit 11 serving as the central control means is characterized in that the unit 11 overlaps the image for drawing on a screen image based on a prescribed synthesizing method and outputs the image to the displaying unit. The central control unit 11 serving as the central control means is further characterized in that the unit 11 performs the screen renewal processing after drawing on the image for drawing and overlaps the image for drawing on a screen image based on a prescribed synthesizing method and outputs the image to the displaying unit.

Furthermore, the central control unit 11 serving as the central control means is characterized in that the unit 11, during the screen renewal processing, calculates a coordinate of a polygon apex corresponding to the view direction angle, calculates a coordinate of a polygon apex corresponding to the view angle, and makes a drawing processing for a screen image based on a texture image. The central control unit 11 serving as the central control means is characterized in that the unit 11, during the drawing processing for the screen image based on the texture image, scans pixels of the screen image, extracts and calculates opacity and color information from the pixels of the texture image and pixels near the texture image corresponding to the pixels of the screen image to be renewed, renews the pixels of the screen image using the opacity and color information, and repeats those steps until completion of the whole pixel scanning corresponding to a polygon surface in the screen image, the completion of extraction of the whole polygon surfaces corresponding to a layer; and the completion of extraction of the whole layers.

The central control unit 11 serving as the central control means is characterized in that the unit 11, during the omnidirectional image renewal processing, calculates a coordinate of a polygon apex corresponding to the view direction angle, calculates a coordinate of a polygon apex corresponding to the view angle, and makes a drawing processing for a texture image based on an image for drawing. Furthermore, The central control unit 11 serving as the central control means is characterized in that the unit 11, during the drawing processing for the texture image based on the image for drawing, scans pixels of the texture image, extracts and calculates opacity and color information from the pixels of the image for drawing and pixels near the image for drawing corresponding to the pixels of the texture image to be renewed, renews the pixels of the texture image using the opacity and color information based on a prescribed synthesizing method, and repeats those steps until completion of the whole pixel scanning corresponding to a polygon surface in the texture image, and the completion of extraction of the whole polygon surfaces corresponding to a layer.

In accordance with the embodiment of the invention, the omnidirectional image editing program is characterized in that the personal computer 10 functions as a central control means in performing the steps of: receiving input information of at least information of a coordinate and a button from the pointing device 30 serving as a manipulation input unit; in a case of a view direction change mode, renewing a view direction angle and a view angle based on the input information, doing a screen renewal processing, and outputting an image to a display device 20 serving as a displaying unit; in a case of a drawing mode, selecting at least a drawing parameter and making drawing on an image for drawing based on the drawing parameter; and in a case of a completion of drawing, executing an omnidirectional image renewal processing, deleting the image for drawing, doing the screen renewal processing, and outputting an image to the displaying unit. The central control unit 11 serving as the central control means is characterized in that the unit 11 overlaps the image for drawing on a screen image based on a prescribed synthesizing method and outputs the image to the displaying unit. The central control unit 11 serving as the central control means is further characterized in that the unit 11 performs the screen renewal processing after drawing on the image for drawing and overlaps the image for drawing on a screen image based on a prescribed synthesizing method and outputs the image to the displaying unit.

DESCRIPTION OF REFERENCE NUMBERS

1 Omnidirectional Image Editing Apparatus
10 Personal Computer
11 Central Control Unit
12 Main Memory
13 Image Controller
13a Video Memory
14 Input And Output Controller
15 Built-In Non-Volatile Memory Device
16 Medium Reading And Writing Interface
20 Displaying Device
30 Pointing Device
40 Omnidirectional Image Input Data
41 Omnidirectional Image Output Data
42 Direction Pixel Relationship Data
50 Program Data

What is claimed is:

1. An omnidirectional image editing apparatus, comprising:
   a manipulation input unit configured to receive an input for manipulation of an omnidirectional image;
   a displaying unit configured to display an image; and
   a central control unit and a non-transitory medium containing instructions of an omnidirectional image editing program, execution of the instructions by the central control unit causing the central control unit to
      receive a coordinate and a button input from the manipulation input unit,
      determine that the manipulation of the omnidirectional image is in a view direction change mode, and subsequently renew a view direction angle and a view angle of the omnidirectional image based on the input from the manipulation input unit, perform screen renewal, and output a resultant image to the displaying unit,
      determine that the manipulation of the omnidirectional image is in a drawing mode, and subsequently select a drawing parameter, determine a drawing image, and draw on the drawing image based on the drawing parameter, and determine that the drawing mode has been completed, and subsequently perform omnidirectional image renewal by ascertaining a direction of each pixel of the omnidirectional image using predetermined direction pixel relationship data that associate a direction with a position of each pixel, delete the drawing image, perform another screen renewal, and output a resultant image to the displaying unit, wherein a view point of the omnidirectional image remains fixed, each screen renewal includes converting the omnidirectional image in a three-dimensional omnidirectional image coordinate system to a display image in a two-dimensional screen coordinate system, and the omnidirectional image renewal includes converting the drawing image in the two-dimensional screen coordinate system to the omnidirectional image in the three-dimensional omnidirectional image coordinate system.

2. The omnidirectional image editing apparatus according to claim 1, wherein the central control unit is configured to overlap the drawing image on a screen image presented by the displaying unit based on a prescribed synthesizing method and to output the overlapped images to the displaying unit.

3. The omnidirectional image editing apparatus according to claim 2, wherein the central control unit, during the screen renewal, calculates a coordinate of a polygon apex corresponding to the view direction angle, calculates a coordinate of a polygon apex corresponding to the view angle, and performs a drawing processing for a screen image presented by the displaying unit based on a texture image.

4. The omnidirectional image editing apparatus according to claim 3, wherein
the screen image includes a plurality of polygon surfaces;
the texture image includes at least one layer, each layer corresponding to a number of the polygon surfaces; and
the central control unit, during the drawing processing for the screen image based on the texture image, scans pixels of the screen image, extracts and calculates opacity and color information from pixels of the texture image and pixels near the pixels of the texture image corresponding to the pixels of the screen image, renews the pixels of the screen image using the opacity and color information, and repeats the scanning, extracting, calculating and renewing until completion of the scanning corresponding to each polygon surface in the screen image, completion of extraction of the polygon surfaces corresponding to each layer, and completion of extraction of the at least one layer.

5. The omnidirectional image editing apparatus according to claim 2, wherein the central control unit, when performing the omnidirectional image renewal, calculates a coordinate of a polygon apex corresponding to the view direction angle, calculates a coordinate of a polygon apex corresponding to the view angle, and performs a drawing processing for a texture image based on the drawing image.

6. The omnidirectional image editing apparatus according to claim 5, wherein
the texture image includes a plurality of polygon surfaces;
the central control unit, during the drawing processing for the texture image based on the drawing image, scans pixels of the texture image, extracts and calculates opacity and color information from pixels of the drawing image and pixels near the pixels of the drawing image corresponding to the pixels of the texture image, renews the pixels of the texture image using the opacity and color information based on a prescribed synthesizing method, and repeats the scanning, extracting, calculating and renewing until completion of the scanning corresponding to each polygon surface in the texture image, and completion of extraction of the plurality of polygon surfaces.

7. The omnidirectional image editing apparatus according to claim 1, wherein the central control unit is configured to perform the another screen renewal after drawing on the drawing image and overlapping the drawing image on a screen image presented by the displaying unit based on a prescribed synthesizing method and outputting the overlapped images to the displaying unit.

8. The omnidirectional image editing apparatus according to claim 7, wherein the central control unit, during the screen renewal, calculates a coordinate of a polygon apex corresponding to the view direction angle, calculates a coordinate of a polygon apex corresponding to the view angle, and performs a drawing processing for a screen image presented by the displaying unit based on a texture image.

9. The omnidirectional image editing apparatus according to claim 8, wherein
the screen image includes a plurality of polygon surfaces;
the texture image includes a plurality of layers, each layer corresponding to a number of the polygon surfaces; and
the central control unit, during the drawing processing for the screen image based on the texture image, scans pixels of the screen image, extracts and calculates opacity and color information from pixels of the texture image and pixels near the pixels of the texture image corresponding to the pixels of the screen image, renews the pixels of the screen image using the opacity and color information, and repeats the scanning, extracting, calculating and renewing until completion of the scanning corresponding to each polygon surface in the screen image, completion of extraction of the polygon surfaces corresponding to each layer, and completion of extraction of the plurality of layers.

10. The omnidirectional image editing apparatus according to claim 7, wherein the central control unit, when performing the omnidirectional image renewal, calculates a coordinate of a polygon apex corresponding to the view direction angle, calculates a coordinate of a polygon apex corresponding to the view angle, and performs a drawing processing for a texture image based on the drawing image.

11. The omnidirectional image editing apparatus according to claim 10, wherein
the texture image includes a plurality of polygon surfaces;
the central control unit, during the drawing processing for the texture image based on the drawing image, scans pixels of the texture image, extracts and calculates opacity and color information from pixels of the drawing image and pixels near the pixels of the drawing image corresponding to the pixels of the texture image, renews the pixels of the texture image using the opacity and color information based on a prescribed synthesizing method, and repeats the scanning, extracting, calculating and renewing until completion of the scanning corresponding to each polygon surface in the texture image, and completion of extraction of the plurality of polygon surfaces.

12. The omnidirectional image editing apparatus according to claim 1, wherein the central control unit, during the screen renewal, calculates a coordinate of a polygon apex corresponding to the view direction angle, calculates a coordinate of a polygon apex corresponding to the view angle, and performs a drawing processing for a screen image presented by the displaying unit based on a texture image.

13. The omnidirectional image editing apparatus according to claim 12, wherein
the screen image includes a plurality of polygon surfaces;
the texture image includes at least one layer, each layer corresponding to a number of the polygon surfaces; and
the central control unit, during the drawing processing for the screen image based on the texture image, scans pixels of the screen image, extracts and calculates opacity and color information from pixels of the texture image and pixels near the pixels of the texture image corresponding to the pixels of the screen image, renews the pixels of the screen image using the opacity and color information, and repeats the scanning, extracting, calculating and renewing until completion of the scanning corresponding to each polygon surface in the screen image, completion of extraction of the polygon surfaces corresponding to each layer, and completion of extraction of the at least one layer.

14. The omnidirectional image editing apparatus according to claim 1, wherein the central control unit, when performing the omnidirectional image renewal, calculates a coordinate of a polygon apex corresponding to the view direction angle, calculates a coordinate of a polygon apex corresponding to the view angle, and performs a drawing processing for a texture image based on the drawing image.

15. The omnidirectional image editing apparatus according to claim 14, wherein
the texture image includes a plurality of polygon surfaces;
the central control unit, during the drawing processing for the texture image based on the drawing image, scans pixels of the texture image, extracts and calculates opacity and color information from pixels of the drawing image and pixels near the pixels of the drawing image corresponding to the pixels of the texture image, renews the pixels of the texture image using the opacity and color information based on a prescribed synthesizing method, and repeats the scanning, extracting, calculating and renewing until completion of the scanning corresponding to each polygon surface in the texture image, and completion of extraction of the plurality of polygon surfaces.

16. The omnidirectional image editing apparatus of claim 1, wherein the drawing parameter is a viewing angle that is between 140 degree and 179.75 degree.

17. A non-transitory computer readable medium storing instructions of an omnidirectional image editing program for manipulation of an omnidirectional image, execution of the instructions by a central control unit of a computer causing the central control unit to perform the steps of:
receiving information of a coordinate and a button from a manipulation input unit;
determining, by the central control unit, that the manipulation of the omnidirectional image is in a view direction change mode, and subsequently renewing a view direction angle and a view angle of the omnidirectional image based on the information received from the manipulation input unit, performing screen renewal, and outputting a resultant image to a displaying unit;
determining, by the central control unit, that the manipulation of the omnidirectional image is in a drawing mode, and subsequently selecting a drawing parameter, determining a drawing image and drawing on the drawing image based on the drawing parameter; and
determining, by the central control unit, that the drawing mode has been completed, and subsequently performing omnidirectional image renewal by ascertaining a direction of each pixel of the omnidirectional image using predetermined direction pixel relationship data that associate a direction with a position of each pixel, deleting the drawing image, performing another screen renewal, and outputting a resultant image to the displaying unit, wherein
a view point of the omnidirectional image remains fixed,
each screen renewal includes converting the omnidirectional image in a three-dimensional omnidirectional image coordinate system to a display image in a two-dimensional screen coordinate system, and
the omnidirectional image renewal includes converting the drawing image in the two-dimensional screen coordinate system to the omnidirectional image in the three-dimensional omnidirectional image coordinate system.

18. The non-transitory computer readable medium of claim 17, further comprising instructions execution of which by the central control unit causes the central control unit
to overlap the drawing image on a screen image presented by the displaying unit based on a prescribed synthesizing method, and
to output the overlapped images to the displaying unit.

19. The non-transitory computer readable medium of claim 17, wherein the step of performing the another screen renewal is performed by the central control unit after the step of drawing on the drawing image, a step of overlapping the drawing image on a screen image presented by the displaying unit based on a prescribed synthesizing method, and a step of outputting the overlapped images to the displaying unit.

20. The non-transitory computer readable medium of claim 17, wherein the drawing parameter is a viewing angle that is between 140 degree and 179.75 degree.

21. A method for manipulation of an omnidirectional image, comprising:
receiving information of a coordinate and a button from a manipulation input unit;
determining, by a central control unit of a computer, that the manipulation of the omnidirectional image is in a view direction change mode, and subsequently renewing a view direction angle and a view angle of the omnidirectional image based on the information received from the manipulation input unit, performing screen renewal, and outputting a resultant image to a displaying unit;
determining, by the central control unit, that the manipulation of the omnidirectional image is in a drawing mode, and subsequently selecting a drawing parameter, determining a drawing image, and drawing on a drawing image based on the drawing parameter; and
determining, by the central control unit, that the drawing mode has been completed, and subsequently performing omnidirectional image renewal by ascertaining a direction of each pixel of the omnidirectional image using predetermined direction pixel relationship data that associate a direction with a position of each pixel, deleting the drawing image, performing another screen renewal, and outputting a resultant image to the displaying unit, wherein a view point of the omnidirectional image remains fixed, each screen renewal includes converting the omnidirectional image in a three-dimensional omnidirectional image coordinate system to a display image in a two-dimensional screen coordinate system, and the omnidirectional image renewal includes converting the drawing image in the two-dimensional screen coordinate system to the omnidirectional image in the three-dimensional omnidirectional image coordinate system.

22. The method of claim 21, further comprising, overlapping, by the central control unit, the drawing image on a screen image presented by the displaying unit based on a prescribed synthesizing method and outputting the overlapped images to the displaying unit.

23. The method of claim 21, wherein the step of performing the another screen renewal is performed by the central control unit after the step of drawing on the drawing image, a step of overlapping the drawing image on a screen image presented by the displaying unit based on a prescribed synthesizing method, and a step of outputting the overlapped images to the displaying unit.

24. The method of claim 21, wherein the drawing parameter is a viewing angle that is between 140 degree and 179.75 degree.

* * * * *